(12) United States Patent
Ota et al.

(10) Patent No.: US 12,453,193 B2
(45) Date of Patent: Oct. 21, 2025

(54) PHOTOELECTRIC CONVERSION APPARATUS

(71) Applicant: CANON KABUSHIKI KAISHA, Tokyo (JP)

(72) Inventors: Yasuharu Ota, Tokyo (JP); Taichi Kasugai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 492 days.

(21) Appl. No.: 17/938,632

(22) Filed: Oct. 6, 2022

(65) Prior Publication Data

US 2023/0120430 A1 Apr. 20, 2023

(30) Foreign Application Priority Data

Oct. 20, 2021 (JP) .................................. 2021-171690

(51) Int. Cl.
*H10F 30/225* (2025.01)
*G01J 1/44* (2006.01)
*H10F 77/00* (2025.01)

(52) U.S. Cl.
CPC ............. *H10F 30/225* (2025.01); *G01J 1/44* (2013.01); *H10F 77/959* (2025.01); *G01J 2001/4466* (2013.01)

(58) Field of Classification Search
CPC ............................. H10F 30/225; H10F 77/959
See application file for complete search history.

(56) References Cited

U.S. PATENT DOCUMENTS

| | | |
|---|---|---|
| 10,750,104 B2 | 8/2020 | Sano |
| 11,115,609 B2 | 9/2021 | Sano |
| 11,695,022 B2 | 7/2023 | Maehashi |
| 11,947,049 B2 | 4/2024 | Nishino |
| 2020/0182692 A1 * | 6/2020 | Lilic .................. G01J 1/44 |
| 2020/0213538 A1 | 7/2020 | Sano |
| 2020/0240837 A1 * | 7/2020 | Ota .................. H04N 25/77 |
| 2020/0322550 A1 | 10/2020 | Sano |
| 2021/0151481 A1 | 5/2021 | Maehashi |
| 2021/0341591 A1 | 11/2021 | Nishino |
| 2022/0014692 A1 | 1/2022 | Sano |
| 2022/0344521 A1 * | 10/2022 | Luo .................. H10F 30/225 |

FOREIGN PATENT DOCUMENTS

| | | |
|---|---|---|
| JP | 2020048019 A | 3/2020 |
| JP | 2021082973 A | 5/2021 |
| WO | 2019035369 A1 | 2/2019 |

* cited by examiner

*Primary Examiner* — Benjamin P Sandvik
(74) *Attorney, Agent, or Firm* — Canon U.S.A., Inc. IP Division

(57) ABSTRACT

A photoelectric conversion apparatus includes a plurality of pixels each including a respective avalanche photodiode, wherein the plurality of pixels includes an active pixel that outputs a photon detection signal according to detection of a photon and an inactive pixel that does not output the photon detection signal, and wherein the photoelectric conversion apparatus further includes a control unit that recharges a voltage to be applied between an anode and a cathode of the avalanche photodiode of the inactive pixel.

17 Claims, 17 Drawing Sheets

PHOTOELECTRIC CONVERSION APPARATUS

BACKGROUND

Field of the Disclosure

The present disclosure relates to the configuration of a photoelectric conversion apparatus.

Description of the Related Art

There is a known photoelectric conversion apparatus in which a plurality of pixels each including an avalanche photodiode (hereinafter abbreviated as APD) are disposed. Each pixel can detect light in a single photon level using a phenomenon in which photocharge due to incidence of a photon on the APD causes avalanche multiplication.

International Publication No. WO2019/035369 discloses a configuration in which some of pixels each including APD are provided for a purpose other than light detection.

SUMMARY

A photoelectric conversion apparatus according to a first aspect of the present disclosure includes a plurality of pixels each including a respective avalanche photodiode, wherein the plurality of pixels includes an active pixel that outputs a photon detection signal according to detection of a photon and an inactive pixel that does not output the photon detection signal, and wherein the photoelectric conversion apparatus further includes a control unit that recharges a voltage to be applied between an anode and a cathode of the avalanche photodiode of the inactive pixel.

A photoelectric conversion apparatus according to a second aspect of the present disclosure includes a plurality of pixels each including a respective avalanche photodiode, wherein the plurality of pixels includes an active pixel that outputs a photon detection signal, and wherein the active pixel recharges a voltage to be applied between an anode and a cathode of the avalanche photodiode of the active pixel during a period other than an exposure period during which photon detection is performed.

Further features of various embodiments will become apparent from the following description of exemplary embodiments with reference to the attached drawings.

DESCRIPTION OF THE EMBODIMENTS

Figure 1:
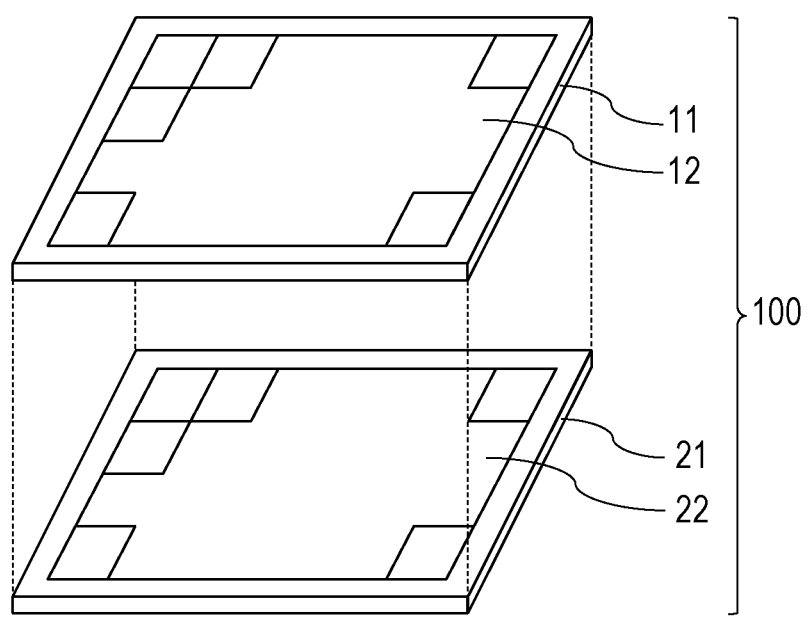
FIG. 1 is a schematic diagram of a photoelectric conversion apparatus according to an embodiment.

The following is for embodying the technical spirit of the present disclosure and is not intended to limit every embodiment. The sizes and the positional relationship of the members shown in the drawings may be exaggerated for the purpose of clarification. In the following description, the same component may be abbreviated using the same reference sign.

Embodiments will be described in detail hereinbelow with reference to the drawings. In the following description, terms indicating specific directions or locations (for example, "top" "bottom", "right", "left", and other terms containing these terms) are used as needed. It is to be understood that those terms are used to facilitate understanding the embodiments with reference to the drawings and that the technical scope of the present disclosure is not limited by the meaning of those terms.

In this specification, a plan view is a view from the direction perpendicular to the light incidence surface of a semiconductor layer. A cross sectional view is a view in the direction perpendicular to the light incidence surface of the semiconductor layer. If the light incidence surface of the semiconductor layer is rough in microscopic view, the plan view is defined on the basis of the light incidence surface of the semiconductor layer in macroscopic view.

In the following description, the anode of an avalanche photodiode (APD) is set at a fixed potential, and signals are taken out from the cathode. Accordingly, a semiconductor region of a first conductivity type in which majority carrier are charges of the same polarity as the signal charge is an N-type semiconductor region, and a semiconductor region of a second conductivity type in which majority carriers are charges of a polarity different from the signal charge is a P-type semiconductor region.

The present disclosure holds also when the cathode of the APD is at a fixed potential, and signals are taken out from the anode. In this case, the semiconductor region of the first conductivity type in which majority carriers are charges of the same polarity as the signal charge is a P-type semiconductor region, and the semiconductor region of the second conductivity type in which majority carriers are charges of a polarity different from the signal charge is a N-type semiconductor region. While the following describes a case where one of the nodes of the APD is at a fixed potential, the potentials of both nodes may be varied.

In this specification, the term "impurity concentration" refers to net impurity concentration minus compensation by impurities of the opposite conductivity type. In other words, "impurity concentration" refers to net doping concentration. A region in which P-type additive impurity concentration is higher than N-type additive impurity concentration is a P-type semiconductor region. In contrast, a region in which N-type additive impurity concentration is higher than P-type additive impurity concentration is an N-type semiconductor region.

FIG. 1 is a diagram illustrating the configuration of a laminated photoelectric conversion apparatus 100. The photoelectric conversion apparatus 100 includes two substrates, a sensor substrate 11 and a circuit substrate 21, layered and electrically connected to each other. The sensor substrate 11 includes a first semiconductor layer including a photoelectric conversion element 102, described later, and a first wiring structure. The circuit substrate 21 includes a second semiconductor layer including a signal processing unit 103, described layer, and a second wiring structure. The photoelectric conversion apparatus 100 is configured such that the second semiconductor layer, the second wiring structure, the first wiring structure, and the first semiconductor layer are laminated in this order. The photoelectric conversion apparatuses described in the individual embodiments are back-side-lamination type photoelectric conversion apparatuses in which light is incident on a second surface and the circuit substrate is placed on a first surface.

In the following description, the sensor substrate 11 and the circuit substrate 21 are diced chips. However, the substrates are not limited to chips. For example, the substrates may be wafers. The substrates may be diced after being laminated in a wafer state or may be diced into chips from wafers and then laminated and joined.

The sensor substrate 11 includes a pixel area 12. The circuit substrate 21 includes a circuit area 22 that processes signals detected in the pixel area 12.

Figure 2:
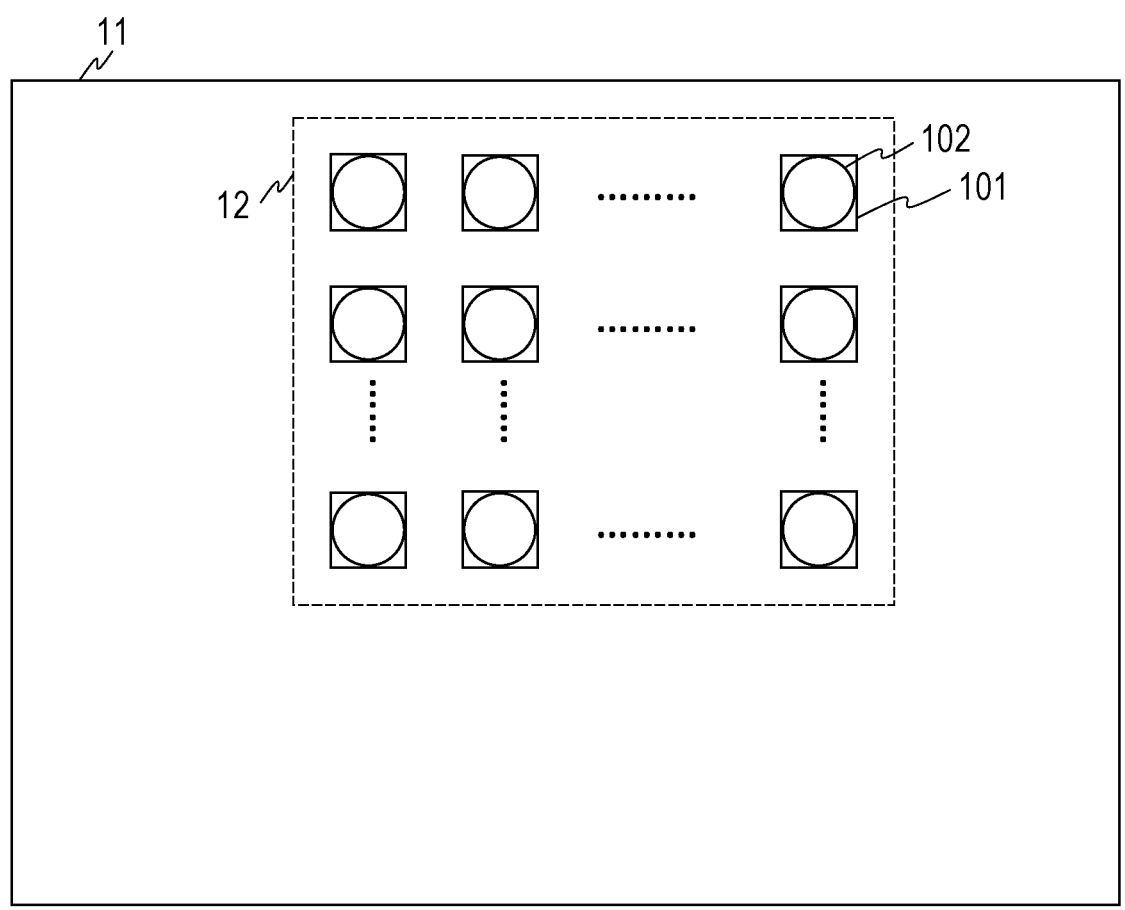
FIG. 2 is a schematic diagram of a photodiode (PD) substrate of a photoelectric conversion apparatus according to an embodiment.

FIG. 2 is a diagram illustrating an example of the arrangement of the sensor substrate 11. Pixels 101 each including the photoelectric conversion element 102 including an APD are arranged in two-dimensional array in plan view to form the pixel area 12.

The pixels 101 are typically for forming an image but, for use in the time of flight (ToF) method, do not necessarily need to form an image. In other words, the pixels 101 may be for measuring the time of arrival of light and the amount of light.

Figure 3:
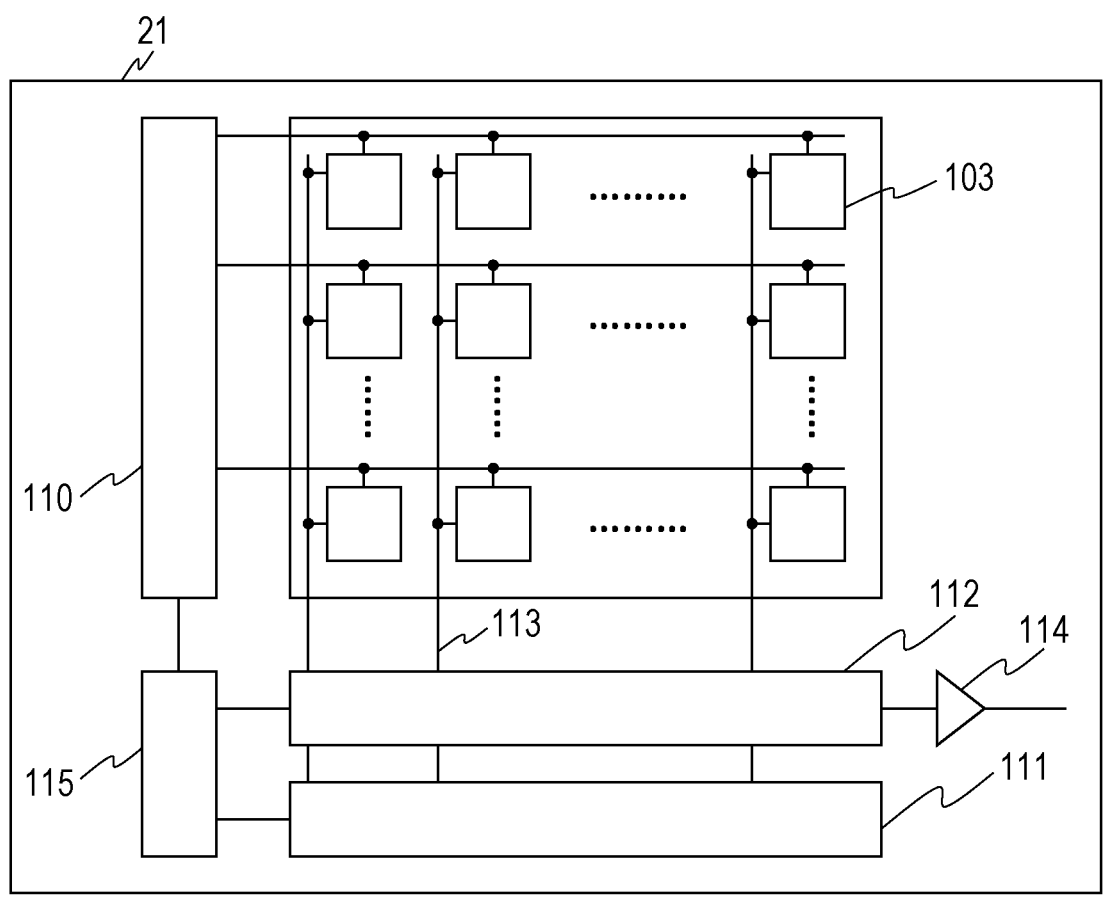
FIG. 3 is a schematic diagram of a circuit substrate of a photoelectric conversion apparatus according to an embodiment.

FIG. 3 is a configuration diagram of the circuit substrate 21. The circuit substrate 21 includes signal processing units 103 that process the charges photoelectrically converted by the photoelectric conversion elements 102 in FIG. 2, a reading circuit 112, a control-pulse generating unit 115, a horizontal scanning circuit unit 111, signal lines 113, and a vertical scanning circuit unit 110.

The photoelectric conversion element 102 in FIG. 2 and the signal processing unit 103 in FIG. 3 are electrically connected via a connecting wire provided for each pixel.

The vertical scanning circuit unit 110 receives a control pulse supplied from the control-pulse generating unit 115 and supplies the control pulse to each pixel. The vertical scanning circuit unit 110 is a logic circuit, such as a shift register or an address decoder.

The signal output from the photoelectric conversion element 102 of each pixel is processed by the signal processing unit 103. The signal processing unit 103 includes a counter and a memory. The memory stores digital values.

The horizontal scanning circuit unit 111 inputs control pulses for selecting the columns in sequence to the signal processing unit 103 to read a signal from the memory of each pixel in which digital signals are stored.

The signal line 113 receives a signal output from the signal processing unit 103 of a pixel of the selected column selected by the vertical scanning circuit unit 110.

The signal output to the signal line 113 is output to a recording unit or a signal processing unit outside the photoelectric conversion apparatus 100 via an output circuit 114.

Referring to FIG. 2, the photoelectric conversion elements 102 in the pixel area 12 may be arranged in a one-dimensional manner. The function of the signal processing unit 103 does not necessarily have to be provided one for every photoelectric conversion element 102. For example, one signal processing unit may be shared by the plurality of photoelectric conversion elements 102, and signal processing may be performed in sequence.

As shown in FIGS. 2 and 3, the plurality of signal processing units 103 is arranged in the region overlapping with the pixel area 12 in plan view. The vertical scanning circuit unit 110, the horizontal scanning circuit unit 111, the reading circuit 112, the output circuit 114, and the control-pulse generating unit 115 are arranged so as to overlap with the space between the end of the sensor substrate 11 and the end of the pixel area 12 in plan view. In other words, the sensor substrate 11 includes the pixel area 12 and a non-pixel area around the pixel area 12. The vertical scanning circuit unit 110, the horizontal scanning circuit unit 111, the reading circuit 112, the output circuit 114, and the control-pulse generating unit 115 are arranged in the area overlapping with the non-pixel area in plan view.

Figure 4:
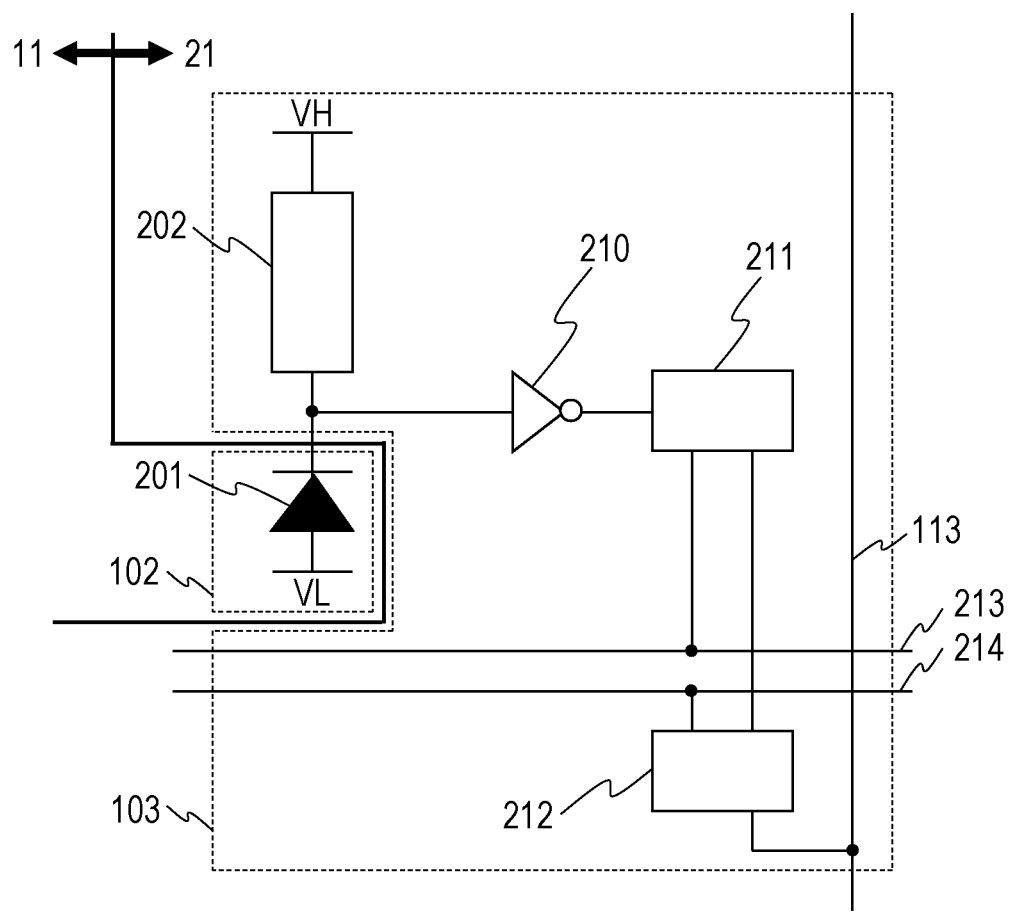
FIG. 4 is a block diagram of an example configuration of a photoelectric conversion apparatus according to an embodiment.

FIG. 4 is an example block diagram including the equivalent circuit in FIGS. 2 and 3. FIG. 4 is a block diagram of a general photoelectric conversion apparatus including an avalanche photodiode (APD).

Referring to FIG. 4, the photoelectric conversion element 102 including an APD 201 is disposed on the sensor substrate 11, and the other components are disposed on the circuit substrate 21.

The APD 201 generates a charge pair according to the incident light by photoelectrical conversion. The anode of the APD 201 is supplied with a voltage VL (a first voltage). The cathode of the APD 201 is supplied with a voltage VH (a second voltage) higher than the voltage VL supplied to the anode. The anode and the cathode are supplied with a reverse bias voltage so that the APD 201 performs an avalanche multiplication operation. By supplying such a voltage, the charge generated by incident light causes avalanche multiplication to generate an avalanche current.

In application of a reverse bias voltage, there is a Geiger mode in which the APD operates with the potential difference between the anode and the cathode larger than the breakdown voltage, and there is a linear mode in which the APD operates with the potential difference between the anode and the cathode near or below the breakdown voltage.

The APD operated in the Geiger mode is referred to as a single-photon avalanche diode (SPAD). For example, the voltage VL (the first voltage) is at −30V, and the voltage VH (the second voltage) is at 3V. The APD 201 may be operated in the linear mode or in the Geiger mode.

A quench element 202 is connected to a power source that supplies the voltage VH and the APD 201. The quench element 202 functions as a load circuit (a quench circuit) at signal multiplication using avalanche multiplication to reduce the voltage to be supplied to the APD 201 thereby reducing avalanche multiplication (a quench operation). The quench element 202 functions to return the voltage to be supplied to the APD 201 to the voltage VH by passing a current corresponding to the voltage drop due to the quench operation (a recharge operation).

The signal processing unit 103 includes a waveform shaping unit 210, a counter 211, and a selection circuit 212.

In this specification, the signal processing unit 103 may include any of the waveform shaping unit 210, the counter 211, and the selection circuit 212.

The waveform shaping unit 210 shapes a change in the potential of the cathode of the APD 201 obtained at photon detection and outputs a pulse signal. One example of the waveform shaping unit 210 is an inverter circuit. FIG. 4 illustrates an example in which one inverter is used as the waveform shaping unit 210. Alternatively, a circuit in which a plurality of inverters is connected in series or another circuit having a waveform shaping effect may be used.

The counter 211 counts the number (number of times) of pulse signals output from the waveform shaping unit 210 and stores the count value. When a control pulse pRES is supplied via a drive line 213, the count value stored in the counter 211 is reset.

The selection circuit 212 is supplied with a control pulse pSEL from the vertical scanning circuit unit 110 in FIG. 3 via a drive line 214 in FIG. 4 (not shown in FIG. 3) to switch between the electrical connection and disconnection between the counter 211 and the signal line 113. The selection circuit 212 includes, for example, a buffer circuit for outputting signals.

The electrical connection may be switched using a switch, such as a transistor, between the quench element 202 and the APD 201 or between the photoelectric conversion element 102 and the signal processing unit 103. Likewise, the voltage VH or the voltage VL supplied to the photoelectric conversion element 102 may be electrically switched using a switch, such as a transistor.

This embodiment shows a configuration using the counter 211. The photoelectric conversion apparatus 100 may include a time-to-digital converter (hereinafter referred to as TDC) and a memory in place of the counter 211 to obtain pulse detection timing. In this case, the generation timing of the pulse signal output from the waveform shaping unit 210 is converted to a digital signal by the TDC. In measuring the timing of the pulse signal, the TDC is supplied with a control pulse pREF (a reference signal) from the vertical scanning circuit unit 110 in FIG. 3 via a drive line. The TDC obtains signals, as digital signals, indicating the relative input timing of the signals output from the individual pixels via the waveform shaping unit 210 with respect to the control pulse pREF.

Figure 5A:
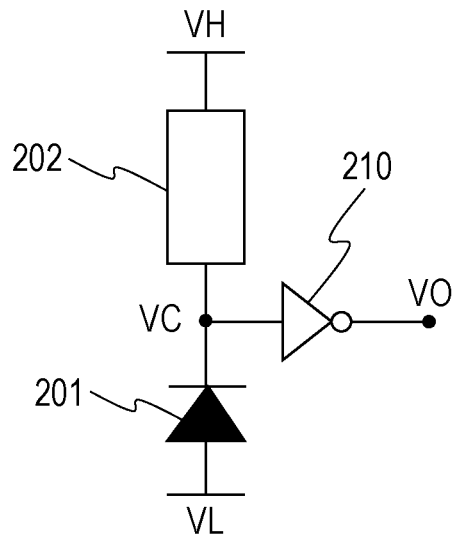
FIG. 5A is a schematic diagram of a pixel circuit of a photoelectric conversion apparatus according to an embodiment.
Figure 5B:
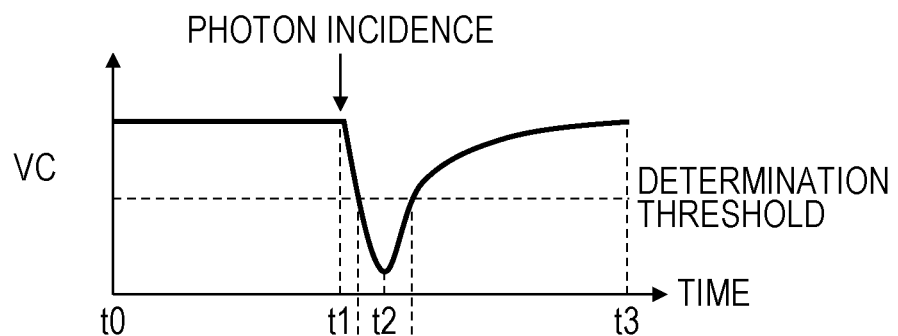
FIGS. 5B and 5C are schematic diagrams showing the driving of the photoelectric conversion apparatus according to the embodiment.
Figure 5C:
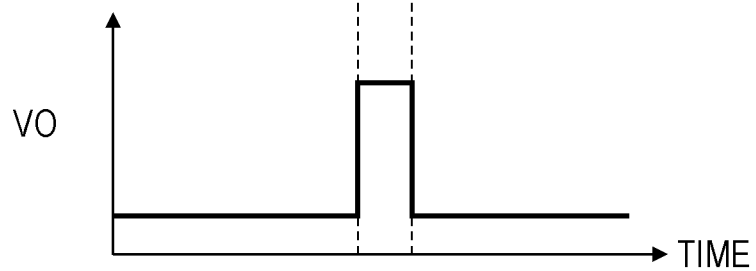

FIGS. 5A to 5C are diagrams schematically show the relationship between the operation of the APD 201 and the output signal.

FIG. 5A is a diagram of the APD 201, the quench element 202, and the waveform shaping unit 210 in FIG. 4, where VC is the input side, and VO is the output side of the waveform shaping unit 210. FIG. 5B shows a change in the waveform of VC in FIG. 5A. FIG. 5C shows a change in the waveform of VO in FIG. 5A.

The APD 201 in FIG. 5A is subjected to a potential difference VH—VL during the period from time t0 to time t1. When a photon enters the APD 201 at time t1, avalanche multiplication occurs in the APD 201, so that an avalanche multiplication current flows through the quench element 202 to drop the voltage of VC. When the amount of voltage drop is further increased to decrease the difference in potential applied to the APD 201, the avalanche multiplication of the APD 201 stops as at time t2, so that the voltage level of VC does not drop above a certain value. Thereafter, during the period from time t2 to time t3, a current compensating for the voltage drop flows to VC from the voltage VL, and, at time t3, the potential level of VC is statically determined to the initial potential level. At that time, the portion of the output waveform of VC exceeding a threshold is shaped by the waveform shaping unit 210 and is output as a signal at VO.

The arrangement of the signal lines 113 and the arrangement of the reading circuit 112 and the output circuit 114 are not limited to those shown in FIG. 3. For example, the signal lines 113 may extend in rows, and the reading circuit 112 may be disposed at the ends of the signal lines 113.

First Embodiment

A photoelectric conversion apparatus according to a first embodiment of the present disclosure will be described with reference to FIGS. 6A to 6C.

Figure 6A:
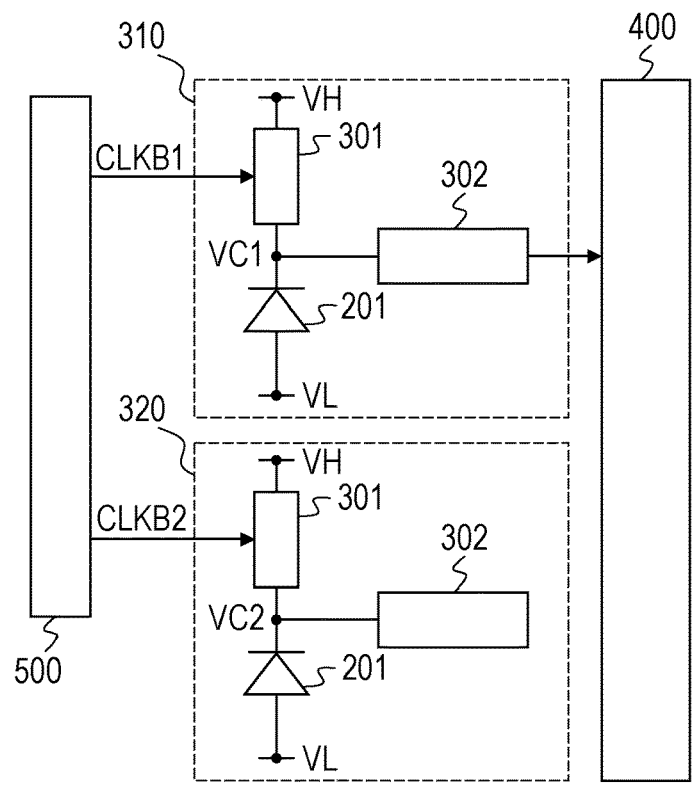
FIG. 6A is a block diagram of a pixel circuit of a photoelectric conversion apparatus according to a first embodiment.

FIG. 6A is a diagram illustrating an image of the circuit configuration of the photoelectric conversion apparatus according to this embodiment. FIG. 6A illustrates the connection relationship among an active pixel 310, an inactive pixel 320, a reading circuit 400, and a control unit 500. The active pixel 310 is a pixel that outputs a photon detection signal to the reading circuit 400. In other words, the active pixel 310 is used for the purpose of light detection. The inactive pixel 320 is a pixel, such as a dummy pixel, that outputs no photon detection signal to the reading circuit 400. In other words, the inactive pixel 320 is used for a purpose other than light detection. The control unit 500 recharges the voltage to be applied between the anode and the cathode of the APD of each pixel.

The active pixel 310 includes an APD 201, a recharge circuit 301, and a processing circuit 302. A clock signal CLKB1 is controlled by the control unit 500. The clock signal CLKB1 drives the recharge circuit 301, when it goes to Low, to recharge the APD 201 to a bias voltage so that the APD 201 is capable of avalanche multiplication in the Geiger mode. The recharge circuit 301 may be any circuit capable of switching the resistance between the APD 201 and the power source, for example, a P-type MOS transistor. When the clock signal CLKB1 goes to High after the APD 201 is recharged to a bias voltage that allows avalanche multiplication, the cathode terminal and the power source voltage VH are isolated from each other, so that the cathode terminal enters a floating state. When a photon is incident on the APD 201 to generate photocharge to cause avalanche multiplication, a cathode voltage VC1 drops to decrease the difference between the anode voltage VL and the cathode voltage VC1 below the breakdown voltage of the APD 201.

The change in cathode voltage VC1 is detected by the processing circuit 302, so that the photon is detected as a signal. The active pixel 310 outputs the result of photon detection during the exposure period from the processing circuit 302 to the reading circuit 400, thereby reading the photon detection result of the pixel.

In contrast, the difference of the inactive pixel 320 from the active pixel 310 is that the processing circuit 302 is not connected to the reading circuit 400. For this reason, even if a photon enters to change a cathode voltage VC2 in a state in which the APD 201 is capable of avalanche multiplication in response to a clock signal CLKB2 controlled by the control unit 500, the result of photon detection cannot be output to the reading circuit 400. For example, the inactive pixel 320 is disposed around a light-shielded active pixel for the purpose of preventing light from entering the active pixel.

Figure 6B:
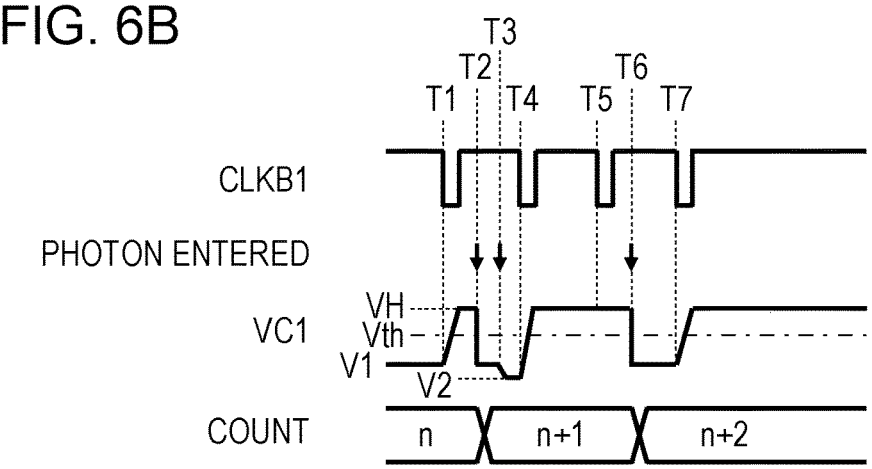
FIGS. 6B and 6C are timing charts showing an example of the driving of the pixel circuit of the photoelectric conversion apparatus according to the first embodiment.

FIG. 6B is a timing chart showing an example of the driving of the active pixel 310 during an exposure period.

Changes in cathode voltage VC1 by control of the clock signal CLKB1 and a basic photon count operation will be described with reference to FIG. 6B. Clock recharge driving for controlling the number of photons detected during the exposure period by bringing the clock signal CLKB1 to Low periodically during the exposure period will also be described.

When the clock signal CLKB1 goes to Low at time T1, the cathode voltage VC1 is recharged from a potential V1 to a potential VH. The voltage applied to the APD 201 at that time is potential VH−potential VL. Assuming that the breakdown voltage of the APD 201 is potential V1−potential VL, the APD 201 is under an excess voltage relative to the breakdown voltage by an amount corresponding to the potential difference of potential VH−potential V1, so that the APD 201 is capable of avalanche multiplication in the Geiger mode.

When a photon enters at time T2, avalanche multiplication occurs in the APD 201 to decrease the cathode voltage VC1 from the potential VH to the potential V1. The bias voltage of the APD 201 at that time is potential V1−potential VL to drop to a voltage lower than the breakdown voltage. The processing circuit 302 detects the change in the cathode voltage VC1 to a threshold voltage Vth or less and counts up the count value of the counter from n to n+1.

Next, a photon enters at time T3, no avalanche multiplication in the Geiger mode occurs because the APD 201 is subjected to a bias voltage less than the breakdown voltage. However, the potential difference between the potential VL and the potential V1 is a reverse bias voltage less than the breakdown voltage, and a reverse current triggered by photocharge is generated, so that the cathode voltage VC1 drops to a potential V2 lower than the potential V1. The drop of the cathode voltage VC1 to a voltage lower than or equal to the breakdown voltage due to the reverse current does not reflect to counting up of the counter and should be managed by the inactive pixel 320, as will be described later.

Since the clock signal CLKB1 goes to Low at time T4, the cathode voltage VC1 is recharged to the potential VH again. The clock signal CLKB1 goes to Low at time T5. However, the cathode voltage VC1 does not change because the cathode voltage VC1 has been recharged to the potential VH.

When a photon enters at time T6, avalanche multiplication occurs to decrease the cathode voltage VC1, and the count value of the counter is counted up to n+2. Thus, the periodical recharge operation is referred to as clock recharge driving, in which the number of times of photon detection during the exposure period is controlled to the upper limit of the number of recharge operations.

Figure 6C:
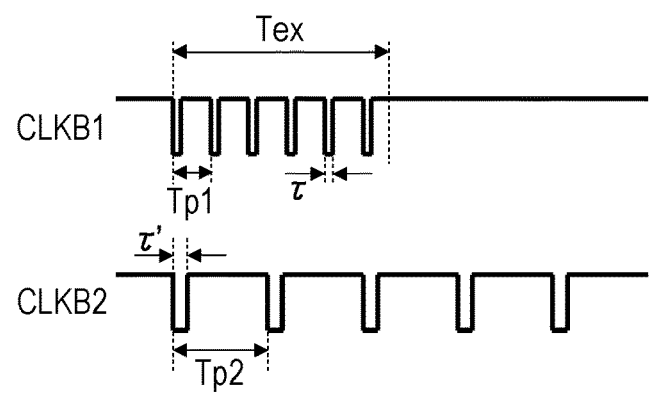

FIG. 6C is a timing chart illustrating the difference in the method of control between the active pixel 310 and the inactive pixel 320 of the photoelectric conversion apparatus of this embodiment, illustrating the timings at which the clock signal CLKB1 and the clock signal CLKB2 are driven. The clock signal CLKB2 is a clock signal for controlling the potential of the APD 201 of the inactive pixel 320.

As shown in FIG. 6A, the inactive pixel 320 is not connected to the reading circuit 400 and does not need to be recharged every photon detection. However, when the cathode terminal is held in a floating state for a long period of time, a voltage drop phenomenon as at time T3 in FIG. 6B may occur a plurality of times, so that the cathode voltage VC2 may continue to drop. For this reason, this embodiment prevents the drop of the cathode voltage VC2 by performing a recharging operation in the inactive pixel 320. If the clock signal CLKB2 is not controlled to keep High, the cathode terminal of the APD 201 is kept in the floating state. If the cathode terminal is kept in the floating state after avalanche multiplication occurs once, as described in the description of FIG. 6B, avalanche multiplication in the Geiger mode is not generated, but a reverse current caused by charges, such as a photocharge, can flow. In the example of the description of FIG. 6B, the potential of the cathode terminal decreased from the potential V1 to the potential V2. If the cathode voltage VC2 is not recharged thereafter, the potential of the cathode terminal continues to drop every time charges are generated. Eventually, a potential exceeding the withstand voltage of a circuit element to which the potential of the cathode voltage VC2 is applied, such as the processing circuit 302, may be applied to damage the circuit element.

Thus, the first embodiment of the present disclosure has the effect of preventing a change in the potential of the terminal of the APD in the inactive pixel by periodically recharging also the inactive pixel.

In FIG. 6C, the active pixel 310 recharges with a pulse width of τ at intervals of Tp1 during the exposure period Tex in response to the clock signal CLKB1, as in FIG. 6B. The inactive pixel 320 recharges using the clock signal CLKB2 at regular intervals of Tp2 with a pulse width of τ' regardless of whether in or out of the exposure period Tex.

Here, the exposure period Tex is longer than the pulse width τ. Not setting the pulse width τ' unnecessarily long allows the frequency of current flow through the APD 201 of the inactive pixel 320 to be lower than that of the active pixel 310, thereby reducing the power consumption of the inactive pixel 320.

The pulse width τ and the pulse width τ' may be equal to or different from each other. For the active pixel 310, the pulse width τ may be as small as possible. However, for the inactive pixel 320, the pulse width τ' may be larger than the pulse width τ. The pulse width τ of the active pixel 310 needs to correspond to a period sufficient for the cathode voltage VC1 to be recharged to a predetermined voltage. However, the inactive pixel 320 does not need to take into account variations in recharged cathode voltage VC2. For this reason, τ' can be decreased within the range in which the effect of recharge is given, reducing the power consumption. Setting the pulse width τ and the pulse width τ' equal allows part of the wires for use in generating and transmitting the pulses of the clock signal CLKB1 and the clock signal CLKB2 to be shared.

The recharge period Tp1 of the active pixel 310 is less than or equal to the recharge period Tp2 of the inactive pixel 320. This relationship allows the power consumption of the inactive pixel 320 to be reduced while preventing damage to the circuit element due to a drop in the cathode voltage VC1.

Second Embodiment

A photoelectric conversion apparatus according to a second embodiment of the present disclosure will be described with reference to FIGS. 7A and 7B.

Figure 7A:
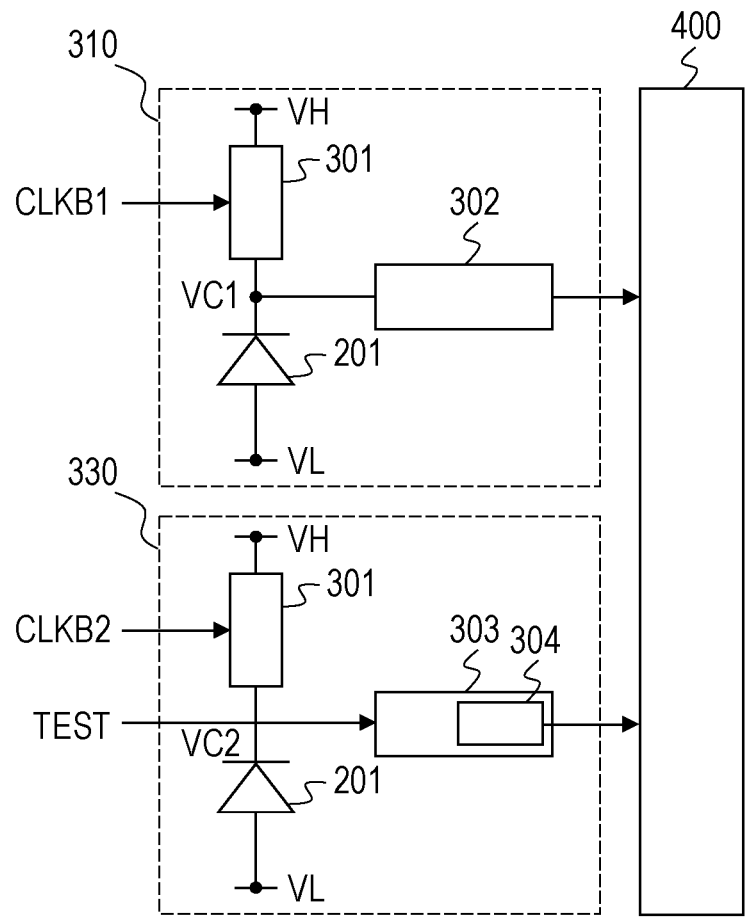
FIG. 7A is a block diagram of a pixel circuit of a photoelectric conversion apparatus according to a second embodiment.

FIG. 7A differs from FIG. 6A in that a test pixel 330, which is a modification of the inactive pixel 320, is disposed in place of the inactive pixel 320. The test pixel 330 differs from the inactive pixel 320 in that the test pixel 330 is connected to the reading circuit 400. The test pixel 330 includes a test processing circuit 303 in place of the processing circuit 302 of the inactive pixel 320. The test processing circuit 303 receives the output of the cathode voltage VC2 of the APD 201 but does not output information on a change in the cathode voltage VC2, that is, photon detection information, to the reading circuit 400. In other words, the test pixel 330 is used for a purpose other than light detection.

The test processing circuit 303 includes a test circuit 304 and outputs a signal for checking the normality of the circuit. The test processing circuit 303 receives a test signal TEST. In other words, the test processing circuit 303 outputs a signal based on an input from an input node different from an output node of the avalanche photodiode. The test signal TEST may change with time or may be fixed. The test signal TEST may be generated outside or inside the test pixel 330. For example, outputting a fixed value from the test circuit 304 allows checking the normality of the output path in FIG. 7A from the test processing circuit 303 to the reading circuit 400. The test processing circuit 303 may have a function for receiving the clock signal CLKB2 and counting the number of pulses of the clock signal CLKB2 with the test circuit 304 to check the normality of the clock signal CLKB2.

Figure 7B:
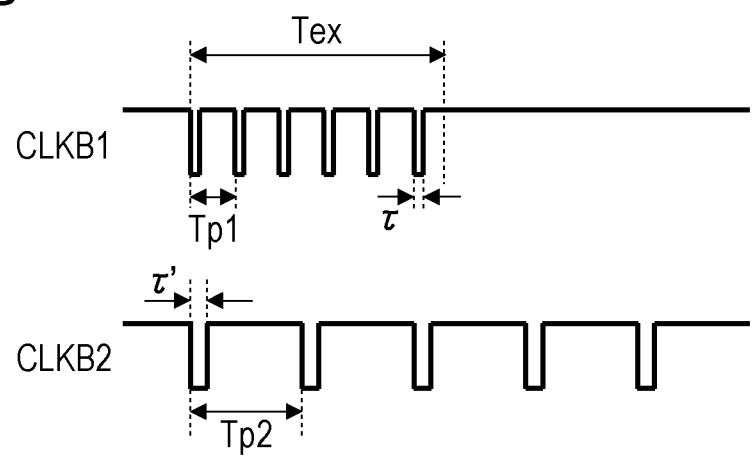
FIG. 7B is a timing chart showing an example of the driving of the pixel circuit of the photoelectric conversion apparatus according to the second embodiment.

FIG. 7B is a timing chart of an example of the driving of the clock signal CLKB1 and the clock signal CLKB2 of this embodiment. FIG. 7B is the same as FIG. 6C, so redundant description will be omitted. Like the inactive pixel 320 of the first embodiment, the test pixel 330 of this embodiment recharges to prevent the cathode voltage VC2 from dropping excessively.

This embodiment has the effect of preventing damage to the circuit element due to a change in the potential of the terminal of the APD 201 in the test pixel 330 by periodically recharging the test pixel 330.

Third Embodiment

A photoelectric conversion apparatus according to a third embodiment of the present disclosure will be described with reference to FIGS. 8A and 8B.

Figure 8A:
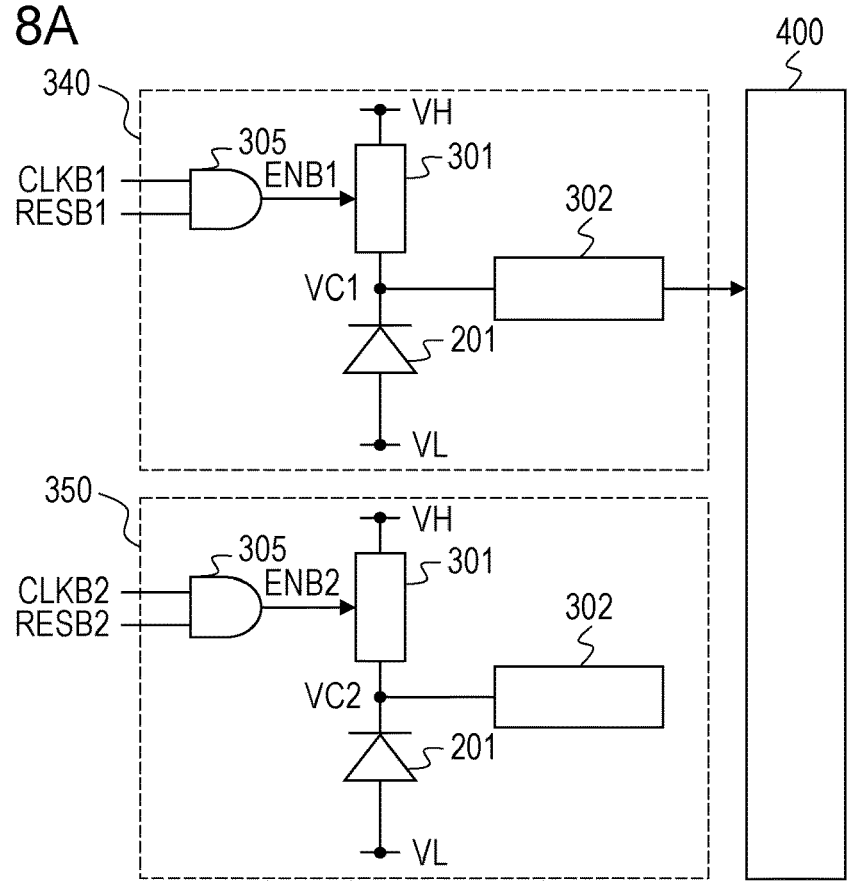
FIG. 8A is a block diagram of a pixel circuit of a photoelectric conversion apparatus according to a third embodiment.

FIG. 8A differs from FIG. 6A in that an active pixel 340 is provided in place of the active pixel 310, and an inactive pixel 350 is provided in place of the inactive pixel 320. Unlike the active pixel 310, the active pixel 340 receives a reset signal RESB1 in addition to the clock signal CLKB1. A recharge signal ENB1, which is an output of a logic circuit 305 that ANDs the clock signal CLKB1 and the reset signal RESB1, controls the recharge circuit 301 of the active pixel 340. When one or both of the clock signal CLKB1 and the reset signal RESB1 is at Low, the recharge signal ENB1 goes to Low to allow the recharge circuit 301 to recharge the cathode voltage VC1. The inactive pixel 350 differs from the active pixel 340 in that the inactive pixel 350 has no output path from the processing circuit 302 to the reading circuit 400.

Figure 8B:
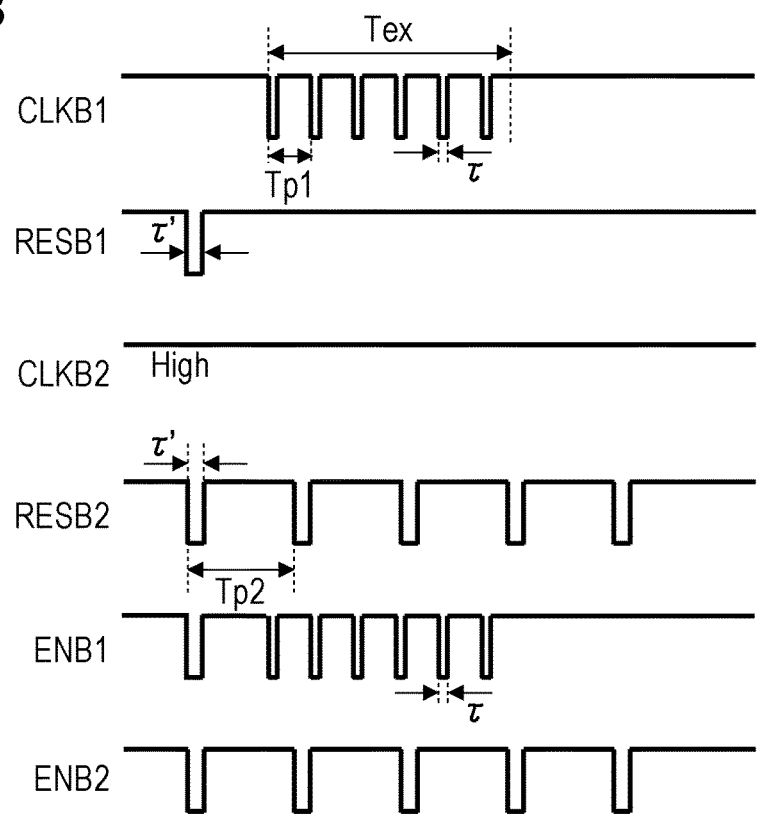
FIG. 8B is a timing chart showing an example of the driving of the pixel circuit of the photoelectric conversion apparatus according to the third embodiment.

FIG. 8B shows an example of drive timing of this embodiment.

The active pixel 340 performs a logical operation to AND the clock signal CLKB1 and the reset signal RESB1 and outputs the recharge signal ENB1. The reset signal RESB1 goes to Low before the start of the exposure period Tex, and the cathode voltage VC1 is recharged. Since the reset signal RESB1 is kept High during the exposure period Tex, the recharge circuit 301 is driven during the exposure period Tex using the clock signal CLKB1 as the recharge signal ENB1.

The driving of the inactive pixel 350 differs from the driving of the active pixel 340 in that the clock signal CLKB2 for controlling the recharge operation in the exposure period Tex is always kept High. In other words, since the inactive pixel 350 is not connected to the reading circuit 400, the operation of periodically recharging the cathode voltage VC2 by bringing the clock signal CLKB2 to Low in the exposure period Tex is not performed. Instead, the reset signal RESB2 periodically goes to Low regardless of the exposure period Tex. This allows also the inactive pixel 350 to periodically recharge the cathode voltage VC2 to prevent the potential of the cathode voltage VC2 from dropping excessively.

Thus, pulses for different applications, such as the clock signal CLKB1 and the clock signal CLKB2 for use in photon detection during the exposure period Tex and the reset signal RESB1 and the reset signal RESB2 for recharging the cathode voltages VC1 and VC2 regardless of whether in or out of the exposure period Tex, are input pixel by pixel. This allows the active pixel 340 and the inactive pixel 350 to individually perform desired driving. Using the different operations allows the recharge operation of the inactive pixel 350 to be controlled to prevent the potential of the cathode voltage VC2 from dropping excessively even if recharge by exposure period control is not performed. This has the effect of preventing damage to the circuit element because of a change in the potential of the terminal of the APD 201.

Fourth Embodiment

A photoelectric conversion apparatus according to a fourth embodiment of the present disclosure will be described with reference to FIGS. 9A and 9B.

Figure 9A:
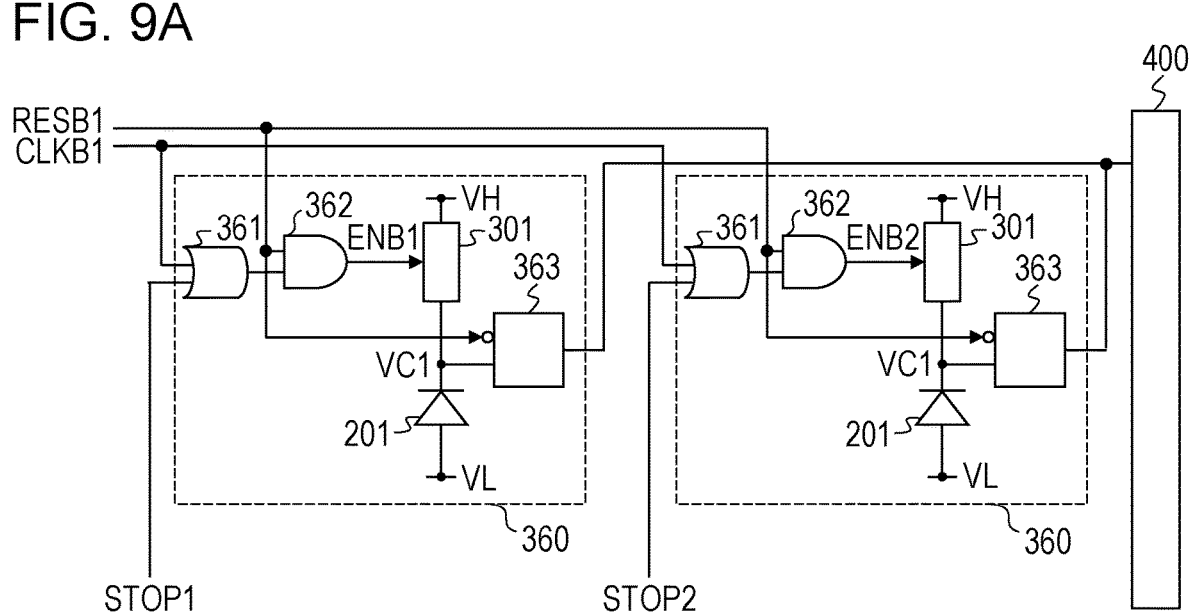
FIG. 9A is a block diagram of a pixel circuit of a photoelectric conversion apparatus according to a fourth embodiment.

In FIG. 9A, two active pixels 360 are arranged on the same row, and the clock signal CLKB1 and the reset signal RESB1 are input to the active pixels 360 in common. The output lines from processing circuits 363 of the active pixels 360 to the reading circuit 400 are in common. Controlling the output lines with a read signal (not shown) allows the signals of the active pixels 360 to be read at different timings. The left pixel of the two active pixels 360 receives a stop signal STOP1, and the right pixel receives a stop signal STOP2. The stop signal STOP1 and the stop signal STOP2 are signals for indicating a photon detecting operation area. For example, when the stop signal STOP1 is at Low, and the stop signal STOP2 is at High, the photon detecting operation of the right pixel that receives the stop signal STOP2 is stopped. This enables a crop operation for stopping a photon detecting operation for a certain pixel area of a plurality of pixels during an exposure period and a thinning-out operation for thinning out pixels periodically, for example, every other row or every two rows. Each active pixel 360 further includes a logic circuit 361 that ORs the clock signal CLKB1 and the stop signal STOP1 and a logic circuit 362 that ANDs the output of the logic circuit 361 and the reset signal RESB1. The reset signal RESB1 is input to the processing circuit 363. Part of the operation of the processing circuit 363 can be reset during the period in which the reset signal RESB1 is at Low. For example, the value counted by a counter (not shown) included in the processing circuit 363 is reset.

Figure 9B:
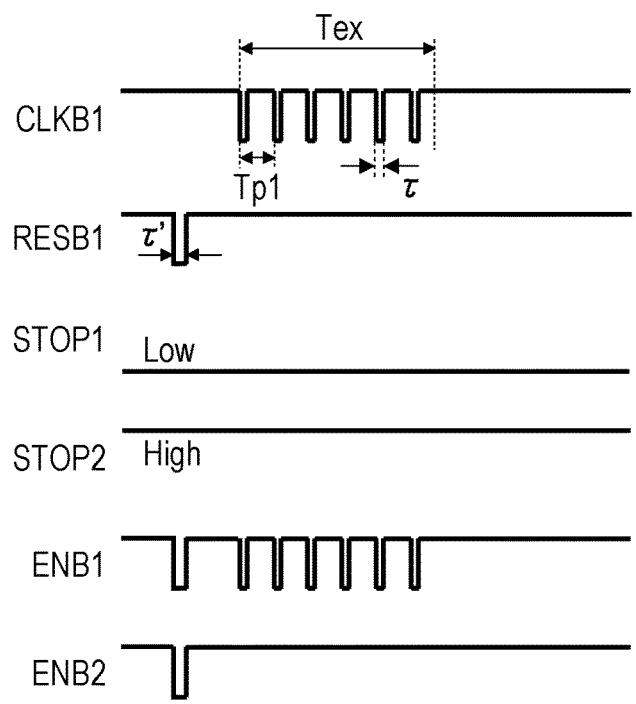
FIG. 9B is a timing chart showing an example of the driving of the pixel circuit of the photoelectric conversion apparatus according to the fourth embodiment.

FIG. 9B shows an example of the drive timing in this embodiment.

Since the stop signal STOP1 input to the left pixel of the two active pixels 360 is constantly at Low, the output of the logic circuit 361 follows the clock signal CLKB1. The logic circuit 362 performs a logical operation to AND the output of the logic circuit 361 and the reset signal RESB1. When one of the clock signal CLKB1 and the reset signal RESB1 is at Low, the recharge signal ENB1 is at Low. For this reason, even if the clock signal CLKB1 for controlling the exposure period Tex or the reset signal RESB1 is at Low, the recharge signal ENB1 is at Low.

The counter is reset at the timing at which the reset signal RESB1 goes to Low. The count period may be controlled so that count-up is performed only during a count enabled period defined by a count enable signal (not shown) input to the processing circuit 363.

In contrast, since the stop signal STOP2 input to the right pixel of the active pixels 360 is constantly at High, the output of the logic circuit 361 is constantly at High. In other words, a change in the clock signal CLKB1 that controls the recharge during the exposure period Tex is not reflected to the recharge signal ENB2. As shown in FIG. 9B, the recharge signal ENB2 goes to Low only at the timing at which the reset signal RESB1 goes to Low. In other words, even if the clock signal CLKB1 for controlling the exposure period Tex does not go to Low, the cathode voltage VC2 can be recharged using the reset signal RESB1. In the right pixel of the active pixels 360, the counter is reset at all the timings at which the cathode voltage VC2 is recharged. For this reason, even if a function for stopping recharge when the counter reaches a maximum value (not shown) is provided, recharge can be performed without problems.

In this embodiment, even if a plurality of pixels that share the control lines for the clock signal CLKB1 and the reset signal RESB1 includes a stopped pixel, the reset signal RESB1 is used also as a recharge signal. This allows preventing the cathode voltage VC1 from dropping excessively without increasing a signal line for recharging the stopped pixel. This has the effect of preventing damage to the circuit element due to a change in the potential of the terminal of the APD 201.

Fifth Embodiment

A photoelectric conversion apparatus according to a fifth embodiment of the present disclosure will be described with reference to FIGS. 10A and 10B.

Figure 10A:
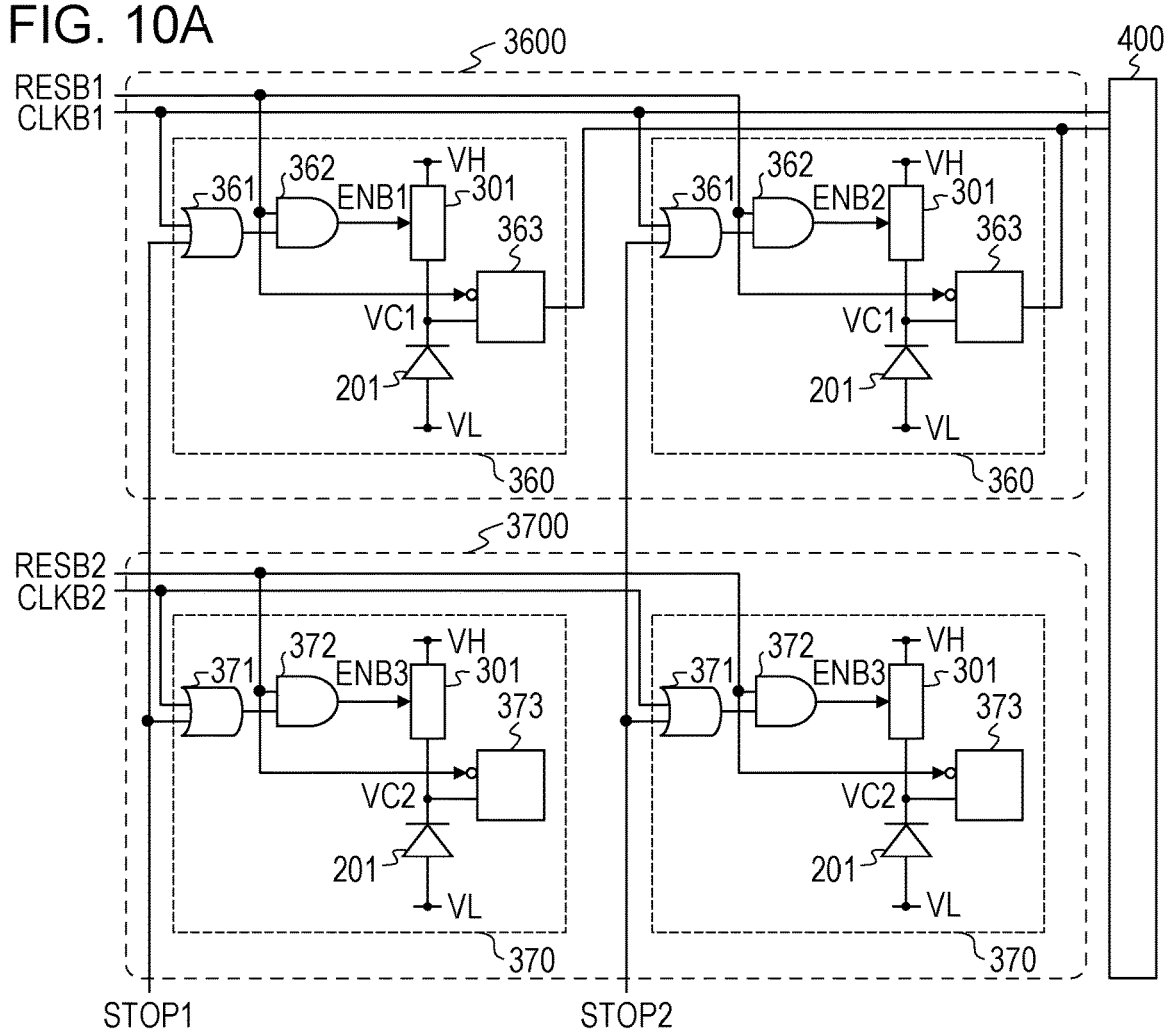
FIG. 10A is a block diagram of a pixel circuit of a photoelectric conversion apparatus according to a fifth embodiment.

In FIG. 10A, two inactive pixels 370 are added in the row below the pixel row in FIG. 9A. The row including the active pixels 360 illustrated in FIG. 9A is defined as an active pixel row 3600, and the row including only the inactive pixels 370 is defined as an inactive pixel row 3700. The difference of the inactive pixels 370 from the active pixels 360 is that processing circuits 373 are not connected to the reading circuit 400. The inactive pixels 370 each include an OR logic circuit 371 and an AND logic circuit 372.

Figure 10B:
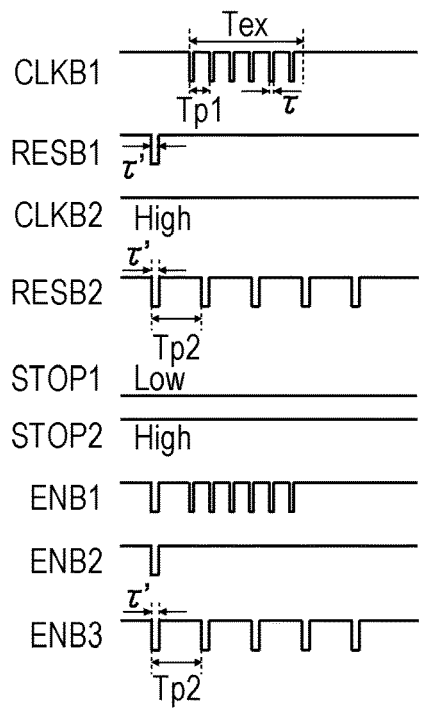
FIG. 10B is a timing chart showing an example of the driving of the pixel circuit of the photoelectric conversion apparatus according to the fifth embodiment.

FIG. 10B shows an example of the drive timing of this embodiment. The description of the active pixel row 3600 will be omitted because it is common to the fourth embodiment. In this embodiment, a clock signal CLKB2 and a reset signal RESB2 different from those of the active pixel row 3600 are input in common to the two inactive pixels 370 included in the inactive pixel row 3700. The left pixel of the two active pixels 360 receives a stop signal STOP1, and the right pixel receives a stop signal STOP2.

The inactive pixels 370 are not connected to the reading circuit 400, and do not need to output a photon detection signal. For this reason, the clock signal CLKB2 for controlling the exposure period Tex of the inactive pixels 370 in the row is constantly at High. In the inactive pixel row 3700, counters (not shown) in the processing circuits 373 are fixed in a stopped state and do not need to be reset as in the active pixels 360.

For this reason, the reset signal RESB2 serving also as a counter reset signal may be used only for the purpose of preventing the cathode voltage VC2 from dropping excessively regardless of whether in or out of the exposure period Tex. In other words, a recharge signal ENB3 is reset to Low also at the timing at which the reset signal RESB2 goes to Low, allowing the cathode voltage VC2 to be recharged periodically. Therefore, the phases and the pulse rise and fall timings, such as the start time of control using the recharge signals ENB1 and ENB2 for the active pixel row 3600 and the recharge signal ENB3 for the inactive pixel row 3700, may differ from one another. The number of pulses of the recharge signal ENB3 per unit time is smaller than that of the recharge signal ENB1.

Thus, the control signals may be individually controlled for the active pixel row 3600 including the active pixels 360 and the inactive pixel row 3700 including only the inactive pixels 370. In combination of control of the stop signal STOP1 and the stop signal STOP2 described in the fourth embodiment, recharge signals may be supplied in the row direction and the column direction as needed. This has the effect of preventing damage to the circuit element due to a change in the potential of the terminal of the APD 201.

Sixth Embodiment

A photoelectric conversion apparatus according to a sixth embodiment of the present disclosure will be described with reference to FIG. 11.

Figure 11:
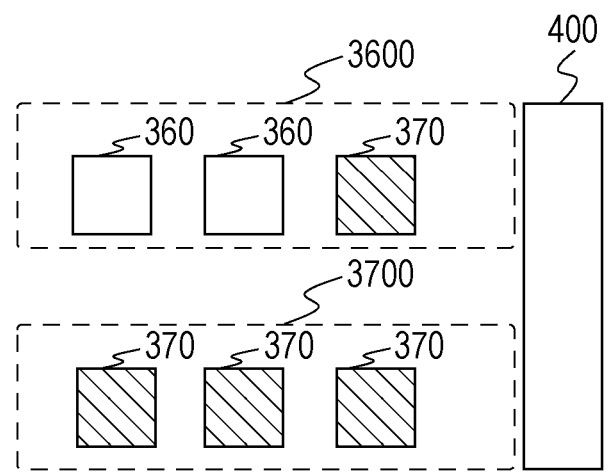
FIG. 11 is a schematic diagram illustrating the pixel circuit arrangement of a photoelectric conversion apparatus according to a sixth embodiment.

FIG. 11 is a diagram illustrating a pixel arrangement in a simplified manner using the reference signs used above.

Unlike the fifth embodiment, the active pixel row 3600 includes the inactive pixel 370.

Controlling the driving as in FIG. 10A by regarding a row including an active pixel even if including an inactive pixel as the active pixel row 3600 enables the recharge of the inactive pixel without increasing the signal control line.

Thus, recharge control for a row including only inactive pixels and recharge control for a row including active pixels are changed as appropriate. This has the effect of reducing excessive drop of the cathode voltage VC1 even if active pixels and inactive pixels are mixed in row and column by performing an appropriate recharge operation. This has the effect of preventing damage to the circuit element due to a change in the potential of the terminals of the APD 201.

Seventh Embodiment

A photoelectric conversion apparatus according to a seventh embodiment of the present disclosure will be described with reference to FIGS. 12A and 12B.

Figure 12A:
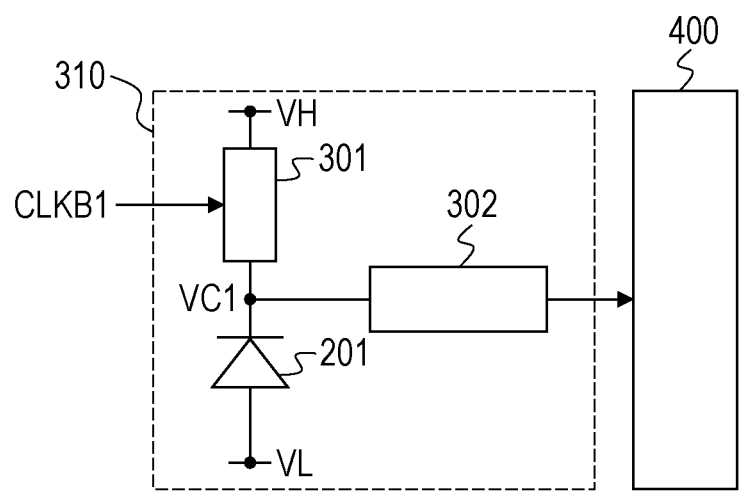
FIG. 12A is a block diagram of a pixel circuit of a photoelectric conversion apparatus according to a seventh embodiment.
Figure 12B:
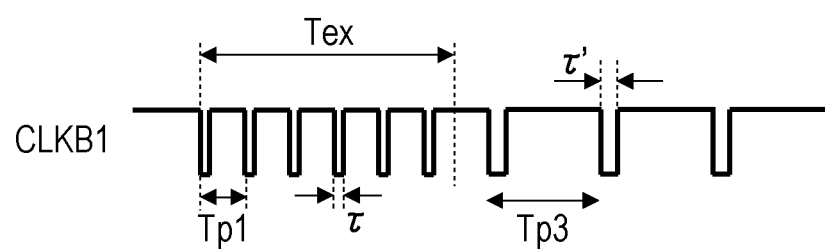
FIG. 12B is a timing chart showing an example of the driving of the pixel circuit of the photoelectric conversion apparatus according to the seventh embodiment.

FIG. 12A is a diagram illustrating the circuit configuration of the photoelectric conversion apparatus of this embodiment. The difference from FIG. 6A is that the inactive pixel 320 is not shown. FIG. 12B is a timing chart showing an example of the driving in this embodiment. The difference from FIG. 6B is that the clock signal CLKB1 changes periodically to perform recharge also during the period other than the exposure period Tex.

For example, in the case where the interval between exposure periods is long, the cathode voltage VC1 can be recharged before continuously dropping in the period other than the exposure period by recharging the cathode voltage VC1 also during the period other than the exposure period. This allows, also for the active pixel, preventing damage to the circuit element due to excessive drop of the cathode voltage VC1.

The relationship Tp3>Tp1 is preferably satisfied, where Tp1 is the recharge period in the exposure period Tex, and Tp3 is the recharge period outside the exposure period Tex. Setting the recharge period Tp3 outside the exposure period Tex longer eliminates the need for unnecessarily increasing the power consumption outside the exposure period Tex.

Let τ be the pulse width in the exposure period Tex, and let τ' be the pulse width outside the exposure period Tex. The pulse width τ' for recharging outside the exposure period Tex is preferably shorter than the exposure period Tex. Setting τ' shorter allows reducing the frequency of current flow through the APD 201, eliminating the need for unnecessarily increasing the power consumption outside the exposure period Tex. The pulse width τ and the pulse width τ' may be equal to or different from each other.

This has the effect of preventing damage to the circuit element due to a change in the potential of the terminal of the APD 201.

Eighth Embodiment

Figure 13:
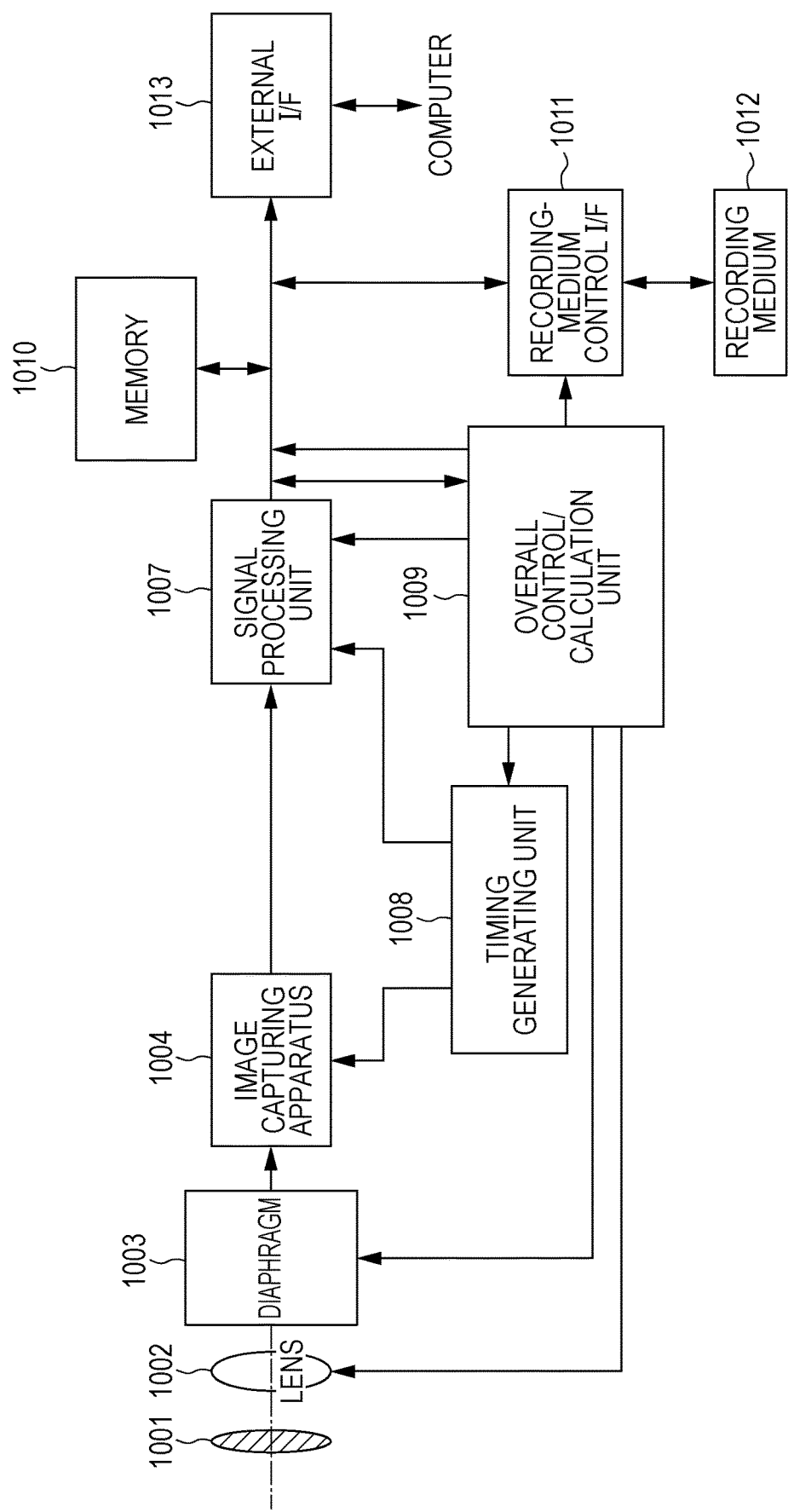
FIG. 13 is a functional block diagram of a photoelectrical conversion system according to an eighth embodiment.

A photoelectrical conversion system according to this embodiment of the present disclosure will be described with reference to FIG. 13. FIG. 13 is a block diagram illustrating, in outline, the configuration of the photoelectrical conversion system according to this embodiment.

The photoelectric conversion apparatuses described in the first to seventh embodiments are applicable to various photoelectrical conversion systems. Examples of the applicable photoelectrical conversion systems include a digital still camera, a digital camcorder, a monitoring camera, a copying machine, a facsimile machine, a mobile phone, an on-vehicle camera, and an observatory satellite. A camera module including an optical system, such as a lens, and an image capturing apparatus is also included in the photoelectrical conversion systems. FIG. 13 illustrates a block diagram of a digital still camera as an example.

The photoelectrical conversion system illustrated in FIG. 13 includes an image capturing apparatus 1004, which is an example of the photoelectric conversion apparatuses and a lens 1002 that forms an optical image of an object on the image capturing apparatus 1004. The photoelectrical conversion system further includes a diaphragm 1003 for varying the amount of light passing through the lens 1002 and a barrier 1001 for protecting the lens 1002. The lens 1002 and the diaphragm 1003 constitute an optical system for collecting light onto the image capturing apparatus 1004. The image capturing apparatus 1004 is any one of the photoelectric conversion apparatuses of the above embodiments and converts an optical image formed by the lens 1002 to an electrical signal.

The photoelectrical conversion system further includes a signal processing unit 1007, which is an image generating unit that generates an image by processing a signal output from the image capturing apparatus 1004. The signal processing unit 1007 performs an operation of performing various kinds of correction and compression as necessary and outputting image data. The signal processing unit 1007 may be provided on a semiconductor substrate on which the image capturing apparatus 1004 is disposed or a semiconductor substrate different from the substrate of the image capturing apparatus 1004.

The photoelectrical conversion system further includes a memory 1010 for temporality storing image data and an external interface (an external I/F) 1013 for communicating with an external computer or the like. The photoelectrical conversion system further includes a recording medium 1012, such as a semiconductor memory, for recording or reading image data and a recording-medium control interface (a recording-medium control I/F) 1011 for recording to or reading from the recording medium 1012. The recording medium 1012 may be housed in the photoelectrical conversion system or may be detachable.

The photoelectrical conversion system further includes an overall control/calculation unit 1009 that performs various calculations and controls the entire digital still camera and a timing generating unit 1008 that outputs various timing signals to the image capturing apparatus 1004 and the signal processing unit 1007. The timing signals may be input from the outside, and the photoelectrical conversion system may include at least the image capturing apparatus 1004 and the signal processing unit 1007 that processes the signal output from the image capturing apparatus 1004.

The image capturing apparatus 1004 outputs an imaging signal to the signal processing unit 1007. The signal processing unit 1007 performs predetermined signal processing on the imaging signal output from the image capturing apparatus 1004 and outputs image data. The signal processing unit 1007 generates an image using the imaging signal.

Thus, this embodiment provides a photoelectrical conversion system incorporating the photoelectric conversion apparatus (the image capturing apparatus) according to any of the embodiments.

Ninth Embodiment

Figure 14A:
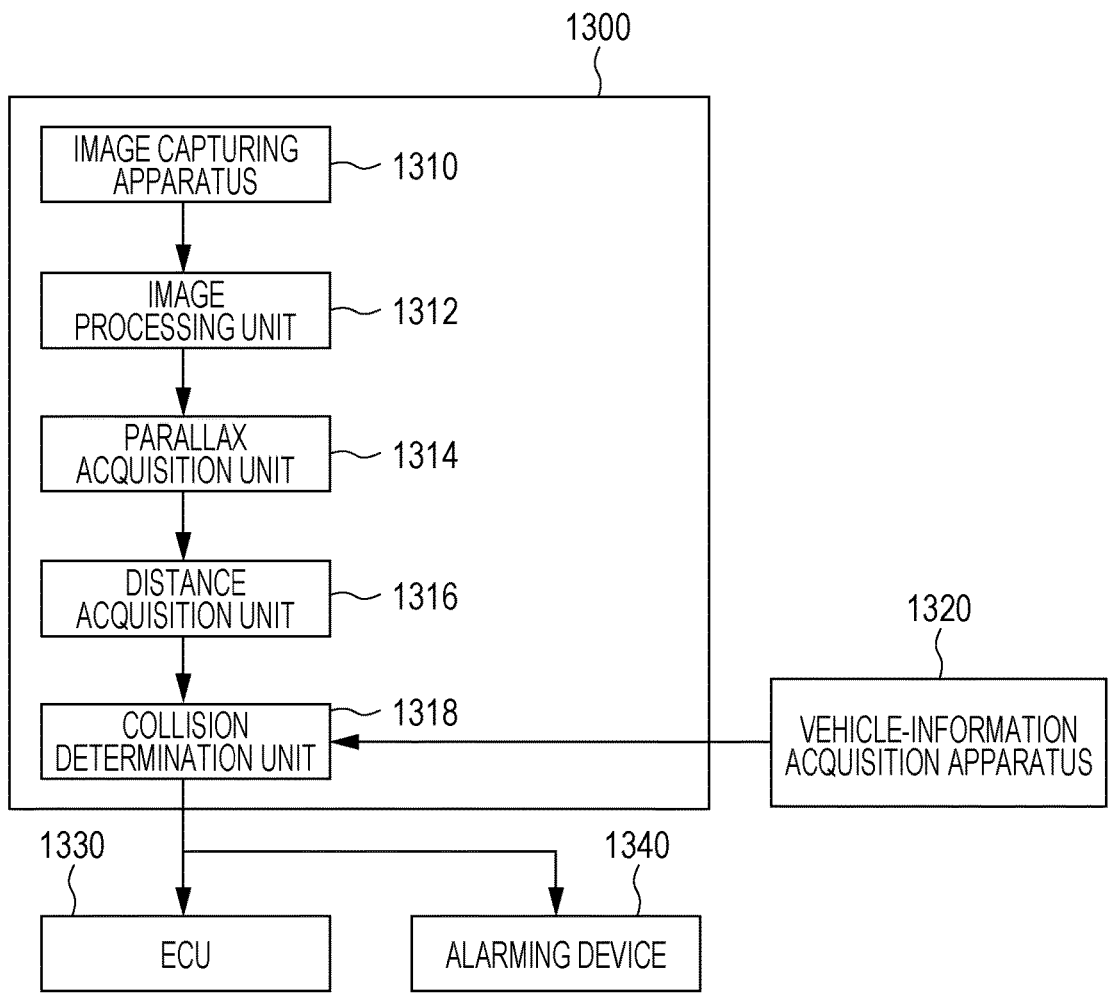
FIGS. 14A and 14B are functional block diagrams of a photoelectrical conversion system according to a ninth embodiment.
Figure 14B:
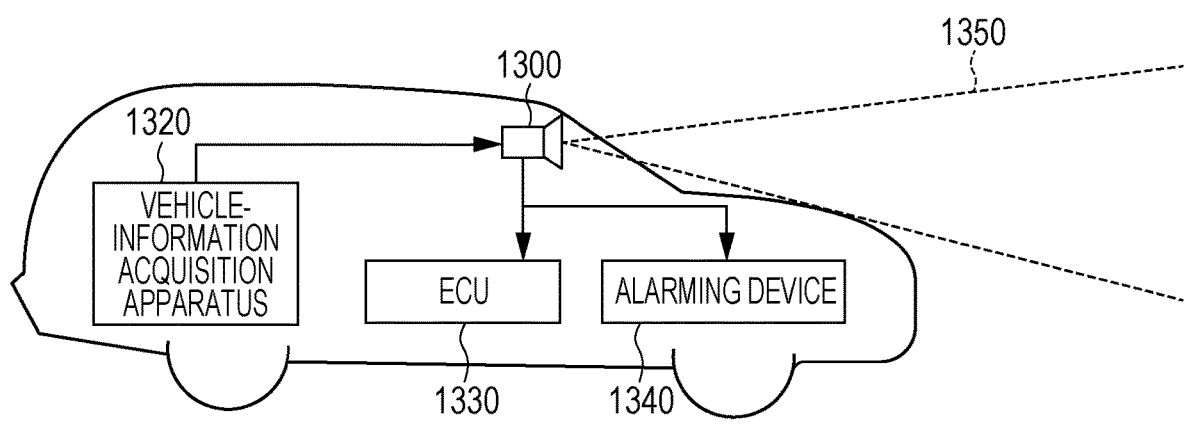

A photoelectrical conversion system and a moving body of this embodiment will be described with reference to FIGS. 14A and 14B. FIGS. 14A and 14B are diagrams illustrating the photoelectrical conversion system and the moving body of this embodiment.

FIG. 14A illustrates an example of a photoelectrical conversion system related to an on-vehicle camera. The photoelectrical conversion system 1300 includes an image capturing apparatus 1310. The image capturing apparatus 1310 is the photoelectric conversion apparatus according to any one of the above embodiments. The photoelectrical conversion system 1300 includes an image processing unit 1312 that performs image processing on a plurality of image data obtained by the image capturing apparatus 1310 and a parallax acquisition unit 1314 that calculates the parallax (the phase difference between parallax images) from the plurality of image data obtained by the photoelectrical conversion system 1300. The photoelectrical conversion system 1300 further includes a distance acquisition unit 1316 that calculates the distance to the object on the basis of the calculated parallax and a collision determination unit 1318 that determines whether collision can occur on the basis of the calculated distance. The parallax acquisition unit 1314 and the distance acquisition unit 1316 are examples of a distance-information acquisition unit that acquires information on the distance to the object. In other words, the distance information is information on the parallax, the amount of defocus, the distance to the object, and so on. The collision determination unit 1318 may determine whether collision can occur using any of the distance information. The distance-information acquisition unit may be implemented by specifically designed hardware or a software module.

The distance-information acquisition unit (e.g., the parallax acquisition unit 1314, the distance acquisition unit 1316) may be implemented by a field-programmable gate array (FPGA), an application specific integrated circuit (ASIC), or a combination thereof.

The photoelectrical conversion system 1300 is connected to a vehicle-information acquisition apparatus 1320 and can acquire vehicle information, such as a vehicle speed, a yaw rate, and a rudder angle. The photoelectrical conversion system 1300 is also connected to an electronic control unit (ECU) 1330, which is a control unit that outputs a control signal for causing the vehicle to generate a braking force on the basis of the determination result of the collision determination unit 1318. The photoelectrical conversion system 1300 is also connected to an alarming device 1340 that gives an alarm to the driver on the basis of the determination result of the collision determination unit 1318. For example, if the determination result of the collision determination unit 1318 shows a high possibility of collision, then the ECU 1330 controls the vehicle to avoid collision by braking, returning the accelerator, or reducing engine output, thereby reducing damage. The alarming device 1340 alarms the user by giving an alarm sound, displaying alarm information on the screen of a car navigation system or the like, or vibrating the seat belt or the steering.

This embodiment captures an image of the surrounding of the vehicle, for example, ahead or the back, with the photoelectrical conversion system 1300. FIG. 14B shows the photoelectrical conversion system when capturing an image ahead of the vehicle (an image capturing range 1350). The vehicle-information acquisition apparatus 1320 issues an instruction to the photoelectrical conversion system 1300 or the image capturing apparatus 1310. This configuration allows the accuracy of ranging to be increased.

The above example shows control to avoid collision with another vehicle. The photoelectrical conversion system 1300 is also applicable to automated cruise control for following another vehicle and automated cruise control for preventing the vehicle from straying out of the lane. The photoelectrical conversion system 1300 is also applicable not only to vehicles, such as automobiles, but also to moving bodies (moving apparatuses), such as ships, aircraft, and industrial robots. In addition, the photoelectrical conversion system 1300 is applicable not only to moving bodies but also to various equipment using object recognition, such as an intelligent transportation system (ITS).

Tenth Embodiment

Figure 15:
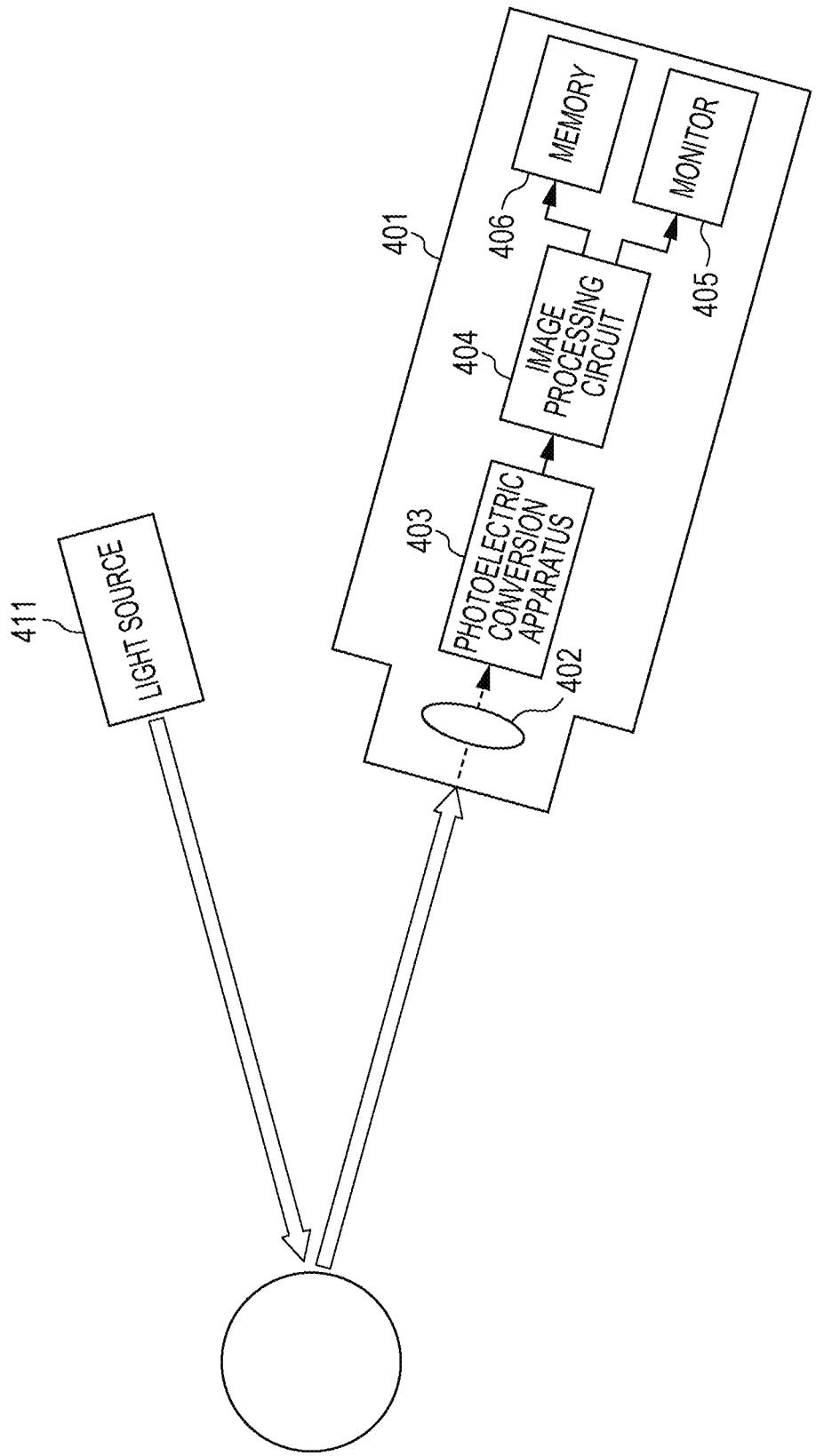
FIG. 15 is a functional block diagram of a photoelectrical conversion system according to a tenth embodiment.

A photoelectrical conversion system of this embodiment will be described with reference to FIG. 15. FIG. 15 is a block diagram illustrating an example configuration of a range image sensor, which is the photoelectrical conversion system of this embodiment.

As shown in FIG. 15, the range image sensor 401 includes an optical system 402, a photoelectric conversion apparatus 403, an image processing circuit 404, a monitor 405, and a memory 406. The range image sensor 401 receives light projected from a light source unit 411 toward an object and reflected by the surface of the object (modulated light or pulsed light) to acquire a range image according to the distance to the object.

The optical system 402 includes one or a plurality of lenses and guides the image light (incident light) from the object to the photoelectric conversion apparatus 403 to form an image on the light receiving surface (sensor) of the photoelectric conversion apparatus 403.

The photoelectric conversion apparatus 403 is any one of the photoelectric conversion apparatuses of the above embodiments, in which a range signal indicating a range obtained from the received-light signal output from the photoelectric conversion apparatus 403 is supplied to the image processing circuit 404.

The image processing circuit 404 performs image processing for forming a range image on the basis of the range signal supplied from the photoelectric conversion apparatus 403. The range image (image data) obtained by the image processing is supplied to the monitor 405 for display or supplied to the memory 406 for storage (recording).

The range image sensor 401 with this configuration can acquire, for example, an accurate range image with improvement in pixel characteristics by incorporating the photoelectric conversion apparatus described above.

11th Embodiment

Figure 16:
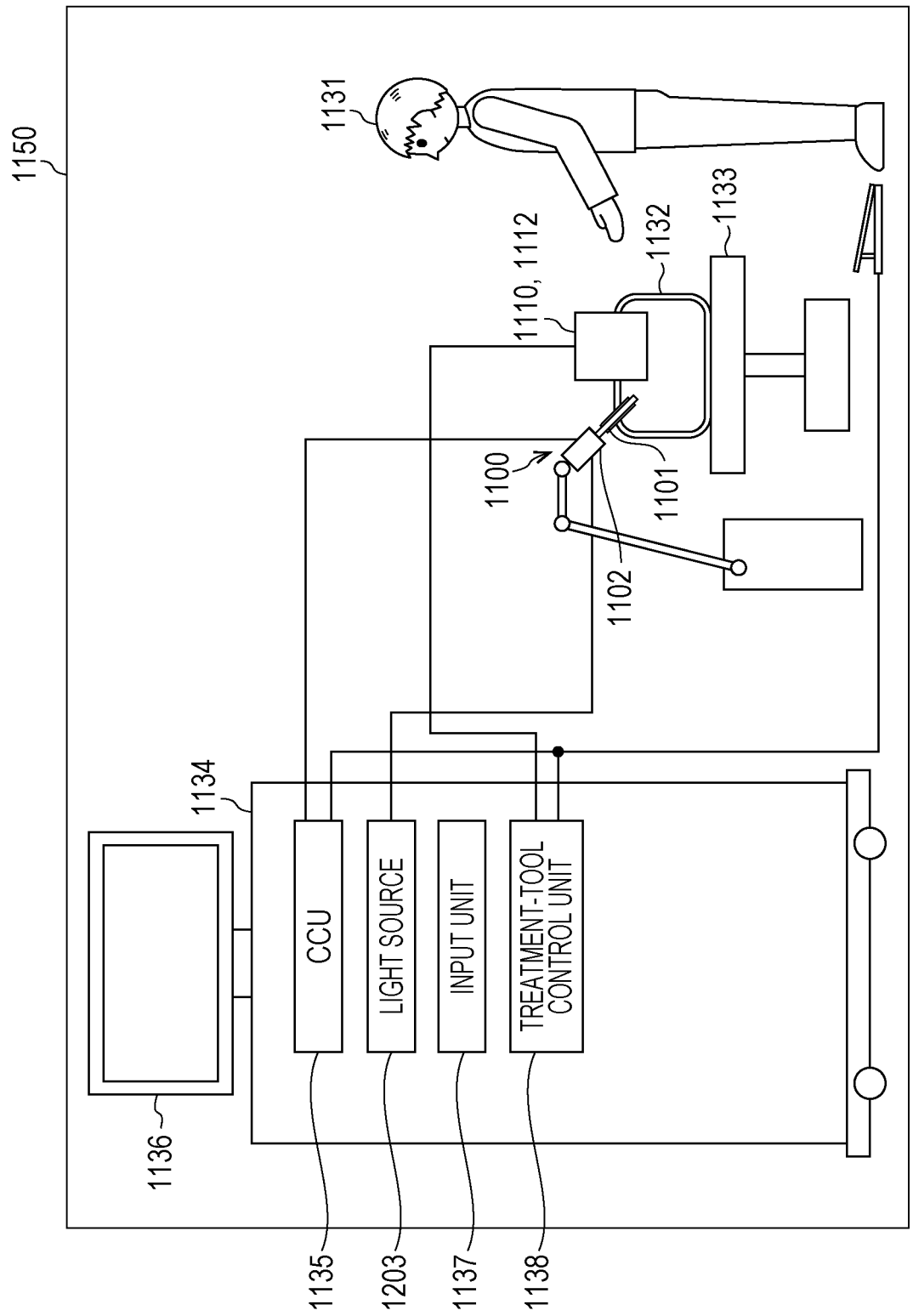
FIG. 16 is a functional block diagram of a photoelectrical conversion system according to an 11th embodiment.

A photoelectrical conversion system of an 11th embodiment will be described with reference to FIG. 16. FIG. 16 is a diagram illustrating an example schematic configuration of an endoscopic surgery system, which is the photoelectrical conversion system of this embodiment.

FIG. 16 illustrates a state in which an operator (doctor) 1131 performs surgery on a patient 1132 on a patient bed 1133 using an endoscopic surgery system 1150. As shown, the endoscopic surgery system 1150 includes an endoscope 1100, a surgical instrument 1110, and a cart 1134 in which various apparatuses for endoscopic surgery are mounted.

The endoscope 1100 includes a lens tube 1101 to be inserted into the body cavity of the patient 1132 by a predetermined length from the leading end and a camera head 1102 connected to the base end of the lens tube 1101. In the illustrated example, the endoscope 1100 is a so-called rigid scope including the rigid lens tube 1101. Alternatively, the endoscope 1100 may be a so-called flexible scope including a flexible lens tube.

The lens tube 1101 includes an opening in which an object lens is fitted at the leading end. The endoscope 1100 connects to a light source unit 1203. The light generated by the light source unit 1203 is guided to the leading end of the lens tube 1101 by a light guide extending in the lens tube 1101 and is applied to the observation target in the body cavity of the patient 1132 via the object lens. The endoscope 1100 may be a direct-vision scope, a straboscope, or a lateral-vision scope.

The camera head 1102 houses an optical system and a photoelectric conversion apparatus. The reflected light (observation light) from the observation target is collected to the photoelectric conversion apparatus by the optical system. The observation light is photoelectrically converted by the photoelectric conversion apparatus to form an electrical signal corresponding to the observation light, that is, an image signal corresponding to the observed image. The photoelectric conversion apparatus may be the photoelectric conversion apparatus according to any one of the embodiments. The image signal is transmitted to a camera control unit (CCU) 1135 as raw data.

The CCU 1135 is constituted by a central processing unit (CPU) or a graphics processing unit (GPU), which provides control over the operation of the endoscope 1100 and a display unit 1136. The CCU 1135 receives the image signal from the camera head 1102 and performs various image processing operations for displaying an image based on the image signal, such as development processing (demosaicing), on the image signal.

The display unit 1136 displays an image based on the image signal subjected to image processing by the CCU 1135 under the control of the CCU 1135.

The light source unit 1203 includes a light source, such as a light emitting diode (LED), and supplies irradiation light in capturing an image of the operative site or the like to the endoscope 1100.

An input unit 1137 is an input interface for the endoscopic surgery system 1150. The user can input various kinds of information and instructions to the endoscopic surgery system 1150 via the input unit 1137.

A treatment-tool control unit 1138 controls driving of an energy treatment tool 1112 for cauterization or incision of tissue or sealing of blood vessels.

The light source unit 1203 that supplies irradiation light for capturing an image of the operative site to the endoscope 1100 may include a white light source formed of an LED, a laser light source, or a combination thereof. If the white light source is a combination of red, green, and blue (RGB) laser sources, the output intensities and output timings of the individual colors (wavelengths) can be controlled with high accuracy. This enables the light source unit 1203 to adjust the white balance of the captured image. In this case, images corresponding to RGB can be captured in time-division by applying RGB laser beams from the individual RGB laser sources to the observation target and controlling the driving of the image sensor of the camera head 1102 in synchronism with the irradiation timings. This method allows acquiring a color image even if the image sensor has no color filter.

The driving of the light source unit 1203 may be controlled so as to change the intensity of output light at predetermined intervals. Controlling the driving of the image sensor of the camera head 1102 in synchronism with the timing of a change in light intensity to acquire images in time-division and combining the images allows an image in a highly dynamic range without black underexposure images and blown out highlights to be generated.

The light source unit 1203 may be capable of supplying light in a predetermined wavelength band corresponding to special light observation. The special light observation uses, for example, the wavelength dependence of light absorption in body tissue. Specifically, the special light observation applies light in a wavelength band narrower than that of irradiation light at normal observation (that is, white light) to capture an image of predetermined tissue, such as the blood vessels of the superficial portion of a mucous membrane, with high contrast.

The special light observation may include fluorescence observation for capturing an image with fluorescence generated by applying exciting light. The fluorescence observation applies exciting light to body tissue to observe fluorescence from the body tissue or locally injects a reagent, such as indocyanine green (ICG), to body tissue and applies exciting light corresponding to the fluorescence wavelength of the reagent to the body tissue to capture a fluorescent image. The light source unit 1203 may be capable of supplying narrow-band light and/or exciting light corresponding to such special light observation.

12th Embodiment

Figure 17A:
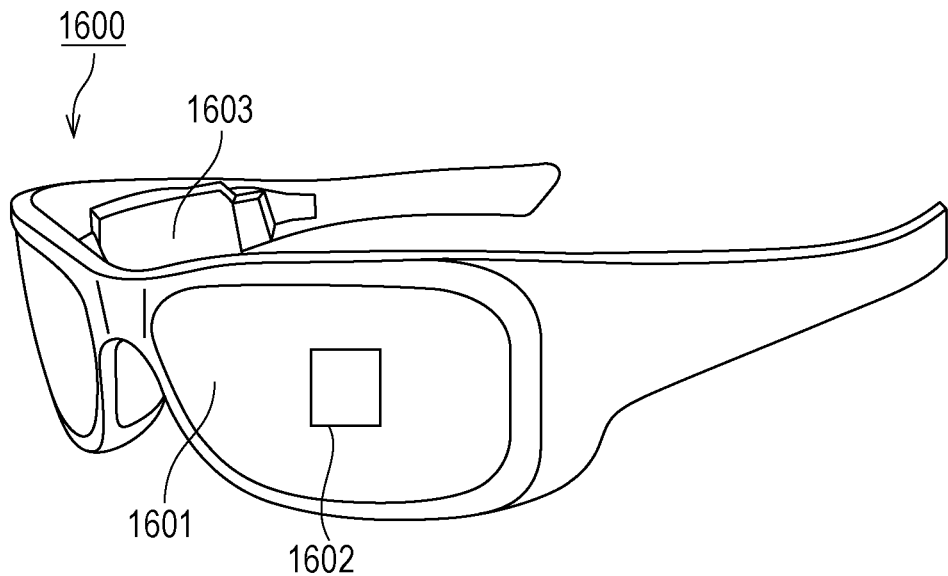
FIG. 17A is a functional block diagram of a photoelectrical conversion system according to a 12th embodiment.

A photoelectrical conversion system of this embodiment will be described with reference to FIGS. 17A and 17B. FIG. 17A illustrates eyeglasses 1600 (smartglasses), which is the photoelectrical conversion system of this embodiment. The eyeglasses 1600 include a photoelectric conversion apparatus 1602. The photoelectric conversion apparatus 1602 is one of the photoelectric conversion apparatuses described in the above embodiments. A display unit including a light-emitting unit, such as an organic light-emitting diode (OLED) or an LED, may be disposed on the back of lenses 1601. The number of the photoelectric conversion apparatus 1602 may be one or two or more. Alternatively, a plurality of kinds of photoelectric conversion apparatuses may be combined. The placement position of the photoelectric conversion apparatus 1602 is not limited to that in FIG. 17A.

The eyeglasses 1600 further include a control unit 1603. The control unit 1603 functions as a power source that supplies electric power to the photoelectric conversion apparatus 1602 and the display unit. The control unit 1603 controls the operation of the photoelectric conversion apparatus 1602 and the display unit. The lenses 1601 include an optical system for collecting light to the photoelectric conversion apparatus 1602.

Figure 17B:
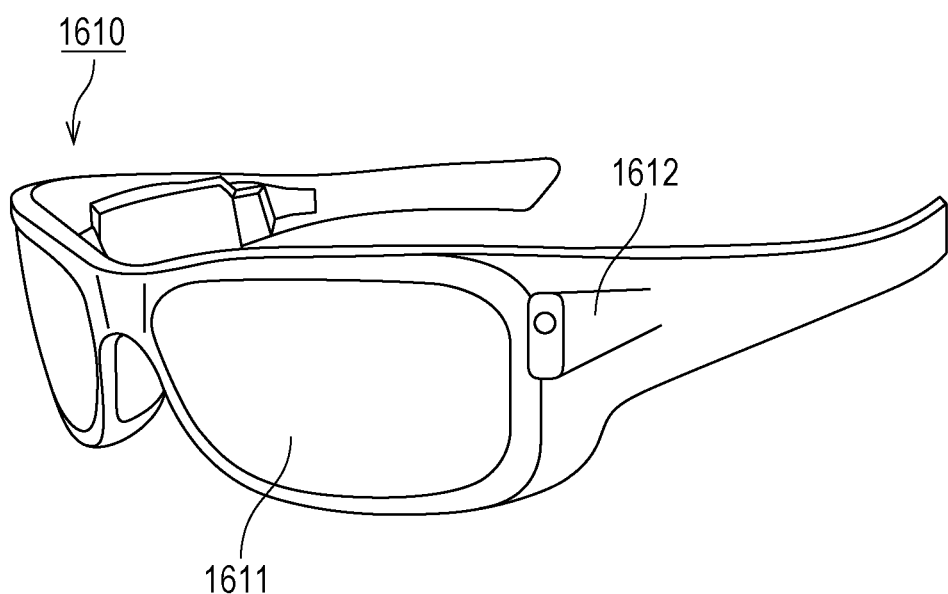
FIG. 17B is a functional block diagram of a photoelectrical conversion system according to the 12th embodiment.

FIG. 17B illustrates eyeglasses 1610 (smartglasses) according to an application. The eyeglasses 1610 includes a control unit 1612. The control unit 1612 includes a photoelectric conversion apparatus corresponding to the photoelectric conversion apparatus 1602 and a display unit. Lenses 1611 include the photoelectric conversion apparatus in the control unit 1612 and an optical system for projecting light from the display unit. The lenses 1611 receive a projected image. The control unit 1612 functions as a power source that supplies electric power to the photoelectric conversion apparatus and the display unit and controls the operation of the photoelectric conversion apparatus and the display unit. The control unit may include a line-of-sight detecting unit that detects the line of sight of the wearer. The line-of-sight detection may use infrared light. An infrared-emitting unit emits infrared light to the eyeballs of the user who is looking at the displayed image. The reflected light of the generated infrared light reflected from the eyeballs is detected by an imaging unit including a light-receiving element to give a captured image of the eyeballs. Providing a reducing unit that reduces the light from the infrared-emitting unit to the display unit in plan view reduces a decrease in image quality.

The line of sight of the user to the displayed image is detected from the captured image of the eyeballs obtained by infrared imaging. The line-of-sight detection using the captured image of the eyeballs may use any known method. One example is a method of line-of-sight detection based on a Purkinje image using reflection of irradiation light from the cornea.

More specifically, a line-of-sight detection process based on a pupil center corneal reflection method is performed. The line of sight of the user is detected by calculating the eye vector indicating the orientation (rotational angle) of the eyeballs on the basis of the image of the pupils included in a captured image of the eyeballs and the Purkinje image using the pupil center corneal reflection method.

The display unit of this embodiment may include a photoelectric conversion apparatus including a light-receiving element and may control a displayed image on the display unit on the basis of line-of-sight information on the user from the photoelectric conversion apparatus.

Specifically, the display unit is segmented into a first view area at which the user looks and a second view area other than the first view area on the basis of line-of-sight information. The first view area and the second view area may be determined by the control unit 1612 for the display unit or may be received after being determined by an external control unit. In the display area of the display unit, the display resolution of the first view area may be controlled so as to be higher than the display resolution of the second view area. In other words, the resolution of the second view area may be lower than the resolution of the first view area.

The display area may include a first display area and a second display area different from the first display area. A higher priority area may be determined from the first display area and the second display area on the basis of line-of-sight information. The first view area and the second view area may be determined by the control unit 1612 of the display unit or may be received after being determined by an external control unit. The resolution of a higher priority area may be controlled so as to be higher than the resolution of an area other than the higher priority area. In other words, the resolution of a relatively low priority area may be set lower.

The determination of the first view area and the higher priority area may be made using artificial intelligence (AI). The AI may be a model configured to estimate the angle of the line of sight and the distance to the object of the line of sight from the images of eyeballs using the images of the eyeballs and the direction in which the eyeballs of the images actually view as training data. An AI program may be provided at the display unit, the photoelectric conversion apparatus, or an external apparatus. The AI program, if provided at the external apparatus, is transmitted to the display unit via communication.

Display control based on visual detection is applicable to smartglasses further including a photoelectric conversion apparatus that images the outside. The smartglasses can display the captured external information in real time.

Modification

Some embodiments are not limited to the above embodiments and can be variously modified.

For example, an example in which part of the configuration of an embodiment is added to another embodiment or replaced with part of the configuration of another embodiment is also included in the embodiments.

The photoelectrical conversion systems shown in the eighth embodiment and the ninth embodiment are examples of a photoelectrical conversion system to which the photoelectric conversion apparatus is applicable. The photoelectrical conversion systems to which the photoelectric conversion apparatus according to an embodiment of the present disclosure is applicable are not limited to the configurations shown in FIGS. 13 and 14. Same applies to the ToF system shown in the tenth embodiment, the endoscope shown in the 11th embodiment, and the smartglasses shown in the 12th embodiment.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-171690, which was filed on Oct. 20, 2021 and which is hereby incorporated by reference herein in its entirety.

What is claimed is:

1. A photoelectric conversion apparatus comprising:
   a plurality of pixels each including a respective avalanche photodiode;
   wherein the plurality of pixels includes an active pixel that outputs a photon detection signal according to detection of a photon and an inactive pixel that does not output the photon detection signal, and
   wherein the photoelectric conversion apparatus further comprises a control unit that recharges a voltage to be applied between an anode and a cathode of the avalanche photodiode of the inactive pixel.

2. The photoelectric conversion apparatus according to claim 1, further comprising a reading circuit,
   wherein the active pixel outputs the photon detection signal to the reading circuit,
   wherein the inactive pixel does not output the photon detection signal to the reading circuit, and
   wherein an output terminal of the inactive pixel is not electrically connected to the reading circuit.

3. The photoelectric conversion apparatus according to claim 2,
   wherein each of the plurality of pixels further includes a respective recharge circuit connected to the avalanche photodiode,
   wherein, in the plurality of pixels, the voltage to be applied to the avalanche photodiode is recharged by controlling the recharge circuit according to a recharge signal.

4. The photoelectric conversion apparatus according to claim 3, wherein the recharge circuit switches resistance between the avalanche photodiode and a power source according to the recharge signal.

5. The photoelectric conversion apparatus according to claim 3, wherein a period corresponding to a pulse width of the recharge signal of the inactive pixel and a period corresponding to a pulse width of the recharge signal of the active pixel differ from each other.

6. The photoelectric conversion apparatus according to claim 3, wherein the active pixel detects a photon during an exposure period.

7. The photoelectric conversion apparatus according to claim 3, wherein the inactive pixel outputs no signal outside the plurality of pixels.

8. The photoelectric conversion apparatus according to claim 3, wherein, in the inactive pixel, both or one of generation and output of the photon detection signal of the inactive pixel is stopped by a thinning-out operation or a crop operation.

9. The photoelectric conversion apparatus according to claim 3, wherein the inactive pixel outputs a signal according to a waveform of the recharge signal.

10. The photoelectric conversion apparatus according to claim 3, further comprising:
a counter to which an output signal from the inactive pixel is input,
wherein a node different from the anode or the cathode of the inactive pixel is connected to an input node of the counter.

11. The photoelectric conversion apparatus according to claim 6, wherein the voltage to be applied to the active pixel is recharged according to the recharge signal during the exposure period of the active pixel, wherein the recharge signal is a clock signal input in a first cycle.

12. The photoelectric conversion apparatus according to claim 11,
wherein the voltage to be applied to the inactive pixel is recharged according to the recharge signal that is a clock signal input in a second cycle, and
wherein the second cycle is longer than the first cycle.

13. The photoelectric conversion apparatus according to claim 3, further comprising:
a counter that counts detected photons according to the photon detection signal,
wherein the voltage to be applied to the avalanche photodiode is recharged according to a reset signal that resets a count of the counter.

14. The photoelectric conversion apparatus according to claim 3,
wherein the recharge signal includes:
a first recharge signal that controls a first pixel area including only the inactive pixel; and
a second recharge signal that controls a second pixel area including both the inactive pixel and the active pixel, and
wherein the first recharge signal and the second recharge signal differ in phase.

15. The photoelectric conversion apparatus according to claim 14,
wherein the inactive pixel generates a third recharge signal by a logical operation between the second recharge signal and a stop signal, and
wherein a pulse count of the third recharge signal per unit time is less than a pulse count of the second recharge signal per unit time.

16. A photoelectrical conversion system comprising:
the photoelectric conversion apparatus according to claim 2; and
a signal processing unit that generates an image using a signal output from the photoelectric conversion apparatus.

17. A moving body comprising:
the photoelectric conversion apparatus according to claim 2; and
a control unit that controls movement of the moving body using a signal output from the photoelectric conversion apparatus.

* * * * *